United States Patent
Hino et al.

(10) Patent No.: US 11,594,927 B2
(45) Date of Patent: Feb. 28, 2023

(54) ROTATING ELECTRIC MACHINE AND MANUFACTURING METHOD THEREFOR

(71) Applicant: Mitsubishi Electric Corporation, Tokyo (JP)

(72) Inventors: Tatsuro Hino, Tokyo (JP); Katsuya Ito, Tokyo (JP); Hiroyuki Yasuda, Tokyo (JP); Tatsuki Kawashima, Tokyo (JP); Kazuya Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 154 days.

(21) Appl. No.: 17/082,505

(22) Filed: Oct. 28, 2020

(65) Prior Publication Data
US 2021/0184525 A1     Jun. 17, 2021

(30) Foreign Application Priority Data
Dec. 13, 2019   (JP) ............................. JP2019-225244

(51) Int. Cl.
*H02K 3/24* (2006.01)
*H02K 3/14* (2006.01)
*H02K 15/04* (2006.01)

(52) U.S. Cl.
CPC ................ *H02K 3/14* (2013.01); *H02K 3/24* (2013.01); *H02K 15/0421* (2013.01); *H02K 2203/06* (2013.01)

(58) Field of Classification Search
CPC combination set(s) only.
See application file for complete search history.

(56) References Cited

U.S. PATENT DOCUMENTS 6,760,965 B2 * 7/2004 Asao ...................... H02K 3/50
                                                  29/598

FOREIGN PATENT DOCUMENTS

| JP | 3593038 | * | 11/2004 | ............... H02K 3/24 |
| JP | 3707306 | * | 10/2005 | ............... H02K 3/24 |
| JP | 2011-072052 A | | 4/2011 | |
| JP | 5770074 B2 | | 7/2015 | |
| JP | 2017034848 | * | 2/2017 | ............... H02K 3/24 |

* cited by examiner

*Primary Examiner* — Tran N Nguyen
(74) *Attorney, Agent, or Firm* — Sughrue Mion, PLLC; Richard C. Turner

(57) ABSTRACT

Provided is a rotating electric machine capable of downsizing a coil end. The rotating electric machine includes an armature core and a plurality of coils. The plurality of coils each include a plurality of turn portions. The plurality of turn portions each include an inner-layer-side turn portion and an outer-layer-side turn portion. The inner-layer-side turn portion includes a first inner-layer-side bent portion, a first inner-layer-side oblique portion, and an inner-layer-side shift portion which is twisted. The outer-layer-side turn portion includes a first outer-layer-side bent portion, a first outer-layer-side oblique portion, and an outer-layer-side shift portion. The outer-layer-side shift portion has the inner-layer-side shift portion arranged between the outer-layer-side shift portion and the armature core.

12 Claims, 15 Drawing Sheets

A-A

B-B

C-C

A-A

B-B

C-C

ROTATING ELECTRIC MACHINE AND MANUFACTURING METHOD THEREFOR

BACKGROUND OF THE INVENTION

1. Field of the Invention

The present disclosure relates to a rotating electric machine including a plurality of coils and a manufacturing method therefor.

2. Description of the Related Art

There has hitherto been known a rotating electric machine including a stator core, which has a plurality of slots arranged in a circumferential direction, and a plurality of coils of distributed winding, which are provided to the stator core. The coils each include a plurality of turn portions which are each provided over a pair of slots, and are each arranged so that one end portion is arranged on an outer side of another end portion in a radial direction. The turn portions each include a pair of oblique portions and a shift portion provided over the pair of oblique portions. An end portion of the shift portion on the oblique portion side is bent toward an outer side in an axial direction and is further bent into a semicircular shape having a line extending in a circumferential direction as a center line (see, for example, Japanese Patent No. 5770074).

SUMMARY OF THE INVENTION

The shift portion of each of the plurality of turn portions provided over the pair of slots is bent toward the outer side in the axial direction and is further bent into the semicircular shape having the line extending in the circumferential direction as the center line. Further, the portions bent into the semicircular shape at respective shift portions overlap each other in the axial direction. As a result, there is a problem in that a coil end of each of the coils is large.

The present disclosure has been made to solve the problem described above, and has an object to provide a rotating electric machine and a manufacturing method therefor, which are capable of downsizing a coil end.

According to at least one embodiment of the present disclosure, there is provided a rotating electric machine, including: an armature core having a plurality of slots arranged in a circumferential direction; and a plurality of coils of distributed winding, which are provided to the armature core, wherein the plurality of the coils each include: a plurality of slot portions which are inserted into the plurality of slots and arranged in a radial direction; and a plurality of turn portions which are connected to the plurality of the slot portions, respectively, and project from the plurality of slots in an axial direction, wherein the plurality of the turn portions each include: an inner-layer-side turn portion connected to the slot portion which is arranged on a center side among the plurality of slot portions arranged in the radial direction; and an outer-layer-side turn portion, which is provided along the inner-layer-side turn portion, and is connected to the slot portion arranged on an outer side among the plurality of slot portions arranged in the radial direction, wherein the inner-layer-side turn portion includes: a first inner-layer-side bent portion, which is connected to the slot portion, projects from the slot in the axial direction, and is bent so as to extend in the circumferential direction as separating away from the slot portion in the axial direction; a first inner-layer-side oblique portion, which is connected to the first inner-layer-side bent portion, and is arranged so as to separate away from the armature core in the axial direction as separating away from the first inner-layer-side bent portion in the circumferential direction; and an inner-layer-side shift portion, which is connected to the first inner-layer-side oblique portion, is bent so that positions of both end portions thereof are apart from each other in the radial direction, and is twisted, wherein the outer-layer-side turn portion includes: a first outer-layer-side bent portion, which is connected to the slot portion, projects from the slot in the axial direction, and is bent so as to extend toward the circumferential direction as separating away from the slot portion in the axial direction; a first outer-layer-side oblique portion, which is connected to the first outer-layer-side bent portion, and is arranged so as to separate away from the armature core in the axial direction as separating away from the first outer-layer-side bent portion in the circumferential direction; and an outer-layer-side shift portion, which is connected to the first outer-layer-side oblique portion, is bent so that positions of both end portions thereof are apart from each other in the radial direction, and has the inner-layer-side shift portion arranged between the outer-layer-side shift portion and the armature core.

According to the rotating electric machine and the manufacturing method therefor of the present disclosure, the coil end can be downsized.

DESCRIPTION OF THE EMBODIMENTS

First Embodiment

Figure 1:
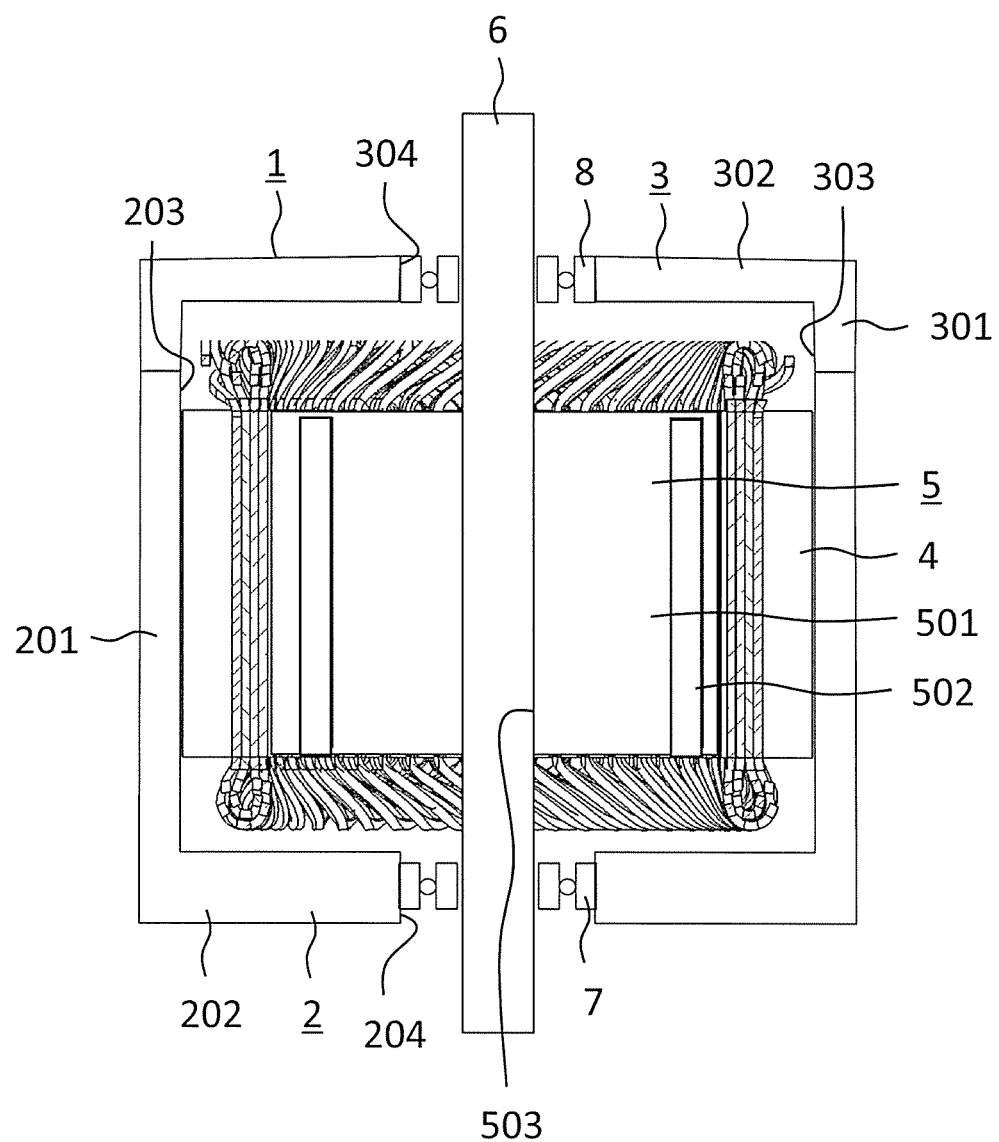
FIG. 1 is a sectional view for illustrating a rotating electric machine according to a first embodiment of the present disclosure.

FIG. 1 is a sectional view for illustrating a rotating electric machine according to a first embodiment of the present disclosure. A rotating electric machine 1 includes a housing 2 and a bracket 3 provided to the housing 2. The housing 2 includes a cylindrical portion 201 and a bottom plate portion 202 provided on one side of the cylindrical portion 201 in an axial direction. An opening portion 203 is formed at a portion of the cylindrical portion 201 on another side in the axial direction. A through hole 204 extending in a plate-thickness direction is formed at a center of the bottom plate portion 202.

The bracket 3 is provided to the housing 2 so as to close the opening portion 203 of the housing 2. The bracket 3 includes a cylindrical portion 301 and a bottom plate portion 302 provided on one side of the cylindrical portion 301 in the axial direction. An opening 303 is formed at a portion of the cylindrical portion 301 on another side in the axial direction. The opening portion 303 is continuous with the opening portion 203. A through hole 304 extending in a plate-thickness direction is formed at a center of the bottom plate portion 302.

Moreover, the rotating electric machine 1 includes a stator 4 and a rotor 5. The stator 4 is an armature provided on an inner side of the housing 2. The rotor 5 is provided on an inner side of the stator 4. Moreover, the rotating electric machine 1 includes a rotary shaft 6, a first bearing 7, and a second bearing 8. The rotary shaft 6 is provided to the rotor 5 and is configured to rotate together with the rotor 5. The first bearing 7 is provided between the housing 2 and the rotary shaft 6. The second bearing 8 is provided between the bracket 3 and the rotary shaft 6.

The stator 4 is fixed to an inner peripheral surface of the cylindrical portion 201 of the housing 2. Examples of a method of fixing the stator 4 to the cylindrical portion 201 of the housing 2 include shrink fitting and press fitting.

The rotary shaft 6 is rotatably supported on the housing 2 and the bracket 3 through intermediation of the first bearing 7 and the second bearing 8. The first bearing 7 is arranged on an inner side of the through hole 204. The second bearing 8 is arranged on an inner side of the through hole 304. Rotation of the rotary shaft 6 causes the rotor 5 to rotate.

The rotor 5 includes a rotor core 501 and a plurality of permanent magnets 502 provided to the rotor core 501. The rotor core 501 is formed into a circular column shape. A through hole 503 passing through a center of the rotor core 501 and extending in the axial direction is formed in the rotor core 501. The rotary shaft 6 is inserted into the through hole 503. The plurality of permanent magnets 502 are provided inside the rotor core 501. The plurality of permanent magnets 502 are arranged at equal intervals in a circumferential direction. The rotating electric machine 1 is a permanent magnet rotating electric machine.

In this example, the axial direction is a direction in which the rotary shaft 6 extends. A radial direction is a radial direction given when an axis of the rotary shaft 6 is a center line. The circumferential direction is a circumferential direction given when the axis of the rotary shaft 6 is the center line.

Figure 2:
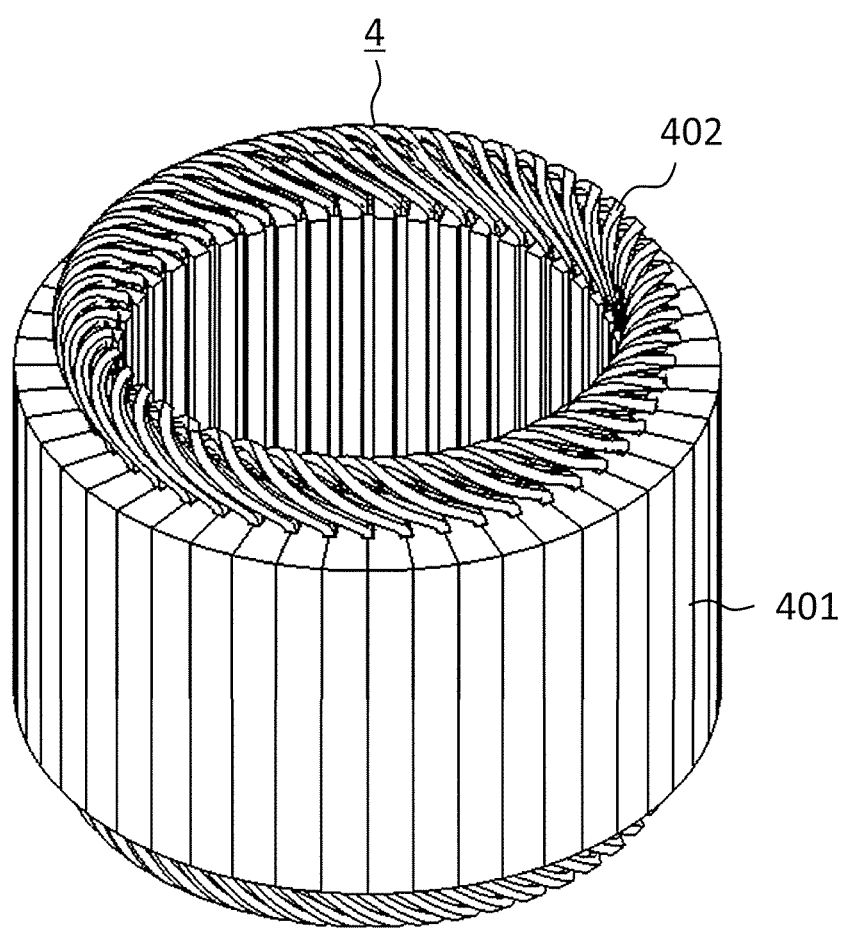
FIG. 2 is a perspective view for illustrating a stator of FIG. 1.

FIG. 2 is a perspective view for illustrating the stator 4 of FIG. 1. The stator 4 includes a stator core 401 being an armature core and a plurality of coils 402 of distributed winding provided to the stator core 401.

The rotor 5 has eight poles, and the stator 4 has forty-eight slots. The plurality of coils 402 are separated into three phases. The plurality of slots are formed in the stator core 401 with a ratio of two slots per pole and per phase.

Figure 3:
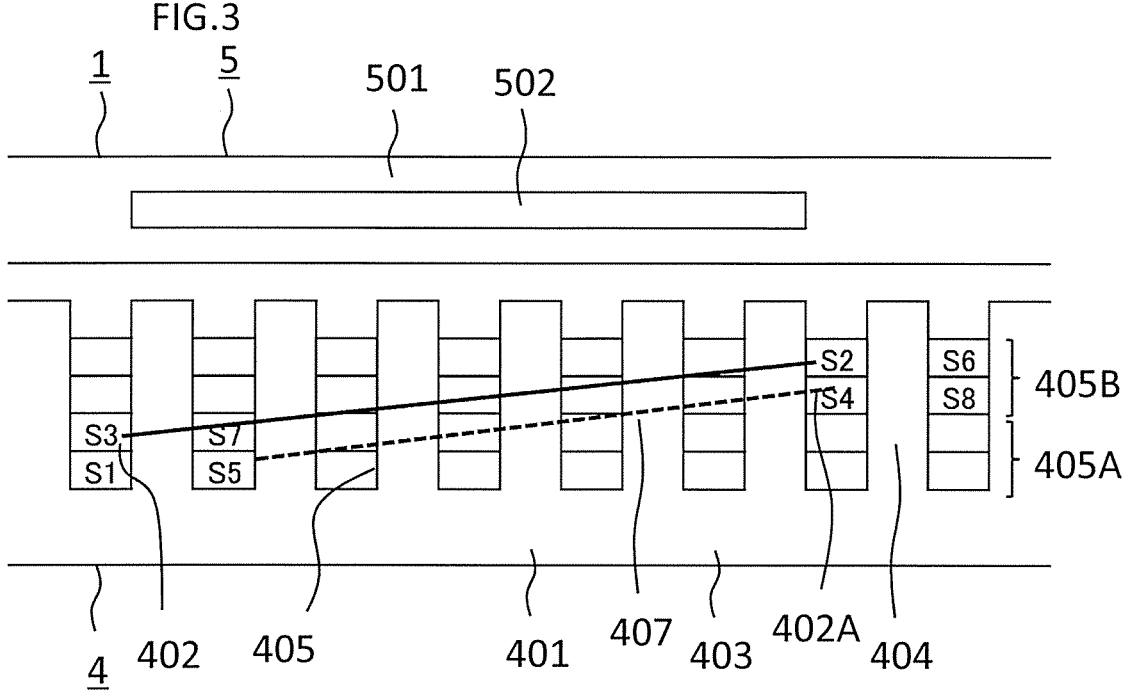
FIG. 3 is a plan view for illustrating a main part of the rotating electric machine of FIG. 1.
Figure 4:
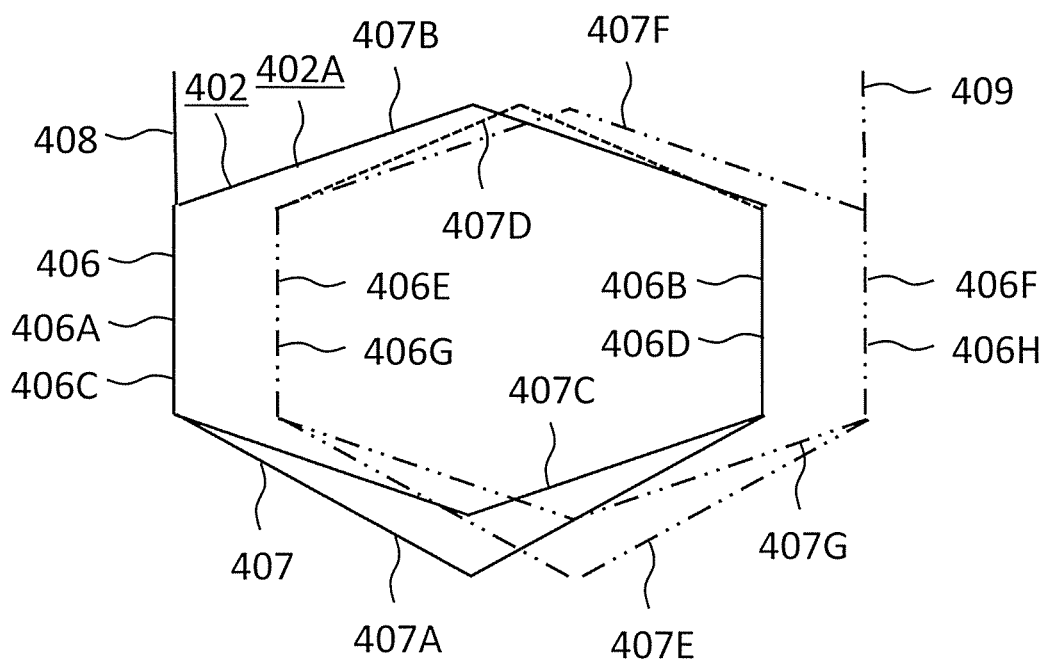
FIG. 4 is a schematic view for illustrating a coil of FIG. 3.

FIG. 3 is a plan view for illustrating a main part of the rotating electric machine 1 of FIG. 1. FIG. 4 is a schematic view for illustrating the coil 402 of FIG. 3. In FIG. 3, a right-and-left direction corresponds to the circumferential direction, and an up-and-down direction corresponds to the radial direction. The stator core 401 includes a core back 403 having a cylindrical shape and a plurality of teeth 404 provided to the core back 403. The plurality of teeth 404 extend from the core back 403 toward an inner side in the radial direction. The plurality of teeth 404 are arranged in the circumferential direction. A slot 405 is formed between teeth 404 adjacent to each other in the circumferential direction. A plurality of slots 405 are arranged in the circumferential direction. The coils 402 are inserted into the plurality of slots 405.

A region of the slot 405 on an outer side in the radial direction is referred to as "slot radially outer region 405A." A region of the slot 405 on an inner side in the radial direction is referred to as "slot radially inner region 405B."

The plurality of coils 402 include a plurality of in-phase coils 402A. The plurality of in-phase coils 402A are in phase with each other, are arranged in the circumferential direction, and are electrically connected to each other. In FIG. 3 and FIG. 4, one in-phase coil 402A is illustrated.

The coil 402 includes slot portions 406 and turn portions 407. The slot portions 406 are inserted into the slots 405. The turn portions 407 each connect a pair of slot portions 406 inserted into different slots 405. Moreover, the coil 402 includes an outer-peripheral-side terminal 408 and an inner-peripheral-side terminal 409. The outer-peripheral-side terminal 408 projects from the slot radially outer region 405A toward one side in the axial direction. The inner-peripheral-side terminal 409 projects from the slot radially inner region 405B toward one side in the axial direction.

In FIG. 3, regions of the plurality of slots 405 into which the plurality of slot portions 406 included in the in-phase coils 402A are inserted are indicated by S1, S2, S3, S4, S5, S6, S7, and S8. The slot portion 406 inserted into the region S1 is referred to as "slot portion 406A." The slot portion 406 inserted into the region S2 is referred to as "slot portion 406B." The slot portion 406 inserted into the region S3 is referred to as "slot portion 406C." The slot portion 406 inserted into the region S4 is referred to as "slot portion 406D." The slot portion 406 inserted into the region S5 is referred to as "slot portion 406E." The slot portion 406 inserted into the region S6 is referred to as "slot portion 406F." The slot portion 406 inserted into the region S7 is referred to as "slot portion 406G." The slot portion 406 inserted into the region S8 is referred to as "slot portion 406H."

The turn portion 407 connecting the slot portion 406A and the slot portion 406B to each other is referred to as "turn portion 407A." The turn portion 407 connecting the slot portion 406B and the slot portion 406C to each other is referred to as "turn portion 407B." The turn portion 407 connecting the slot portion 406C and the slot portion 406D to each other is referred to as "turn portion 407C." The turn portion 407 connecting the slot portion 406D and the slot portion 406E to each other is referred to as "turn portion 407D." The turn portion 407 connecting the slot portion 406E and the slot portion 406F to each other is referred to as "turn portion 407E." The turn portion 407 connecting the slot portion 406F and the slot portion 406G to each other is referred to as "turn portion 407F." The turn portion 407 connecting the slot portion 406G and the slot portion 406H to each other is referred to as "turn portion 407G."

The outer-peripheral-side terminal 408 and the inner-peripheral-side terminal 409 are connected to another in-phase coil 402A or an inverter device. The inverter device is configured to supply a current to the coils 402.

For example, when a current is supplied from an outside to the outer-peripheral-side terminal 408, the current flows through the inner-peripheral-side terminal 409 via the slot portions 406 and the turn portions 407, and then is supplied to another in-phase coil 402A. Through the supply of the current to the coils 402, a magnetic field is generated in the stator.

The pair of slot portions 406 indicated by the region S1 and the region S2 are inserted into the pair of slots 405 spaced apart in the circumferential direction by the amount corresponding to six slots 405, and are connected to each other by the turn portion 407. Similarly, the pair of slot portions 406 indicated by the region S2 and the region S3 and the pair of slot portions 406 indicated by the region S3 and the region S4 are inserted into the pair of slots 405 spaced apart in the circumferential direction by the amount corresponding to six slots 405, and are connected to each other by the turn portion 407.

Meanwhile, the pair of slot portions 406 indicated by the region S4 and the region S5 are inserted into the pair of slots 405 spaced apart in the circumferential direction by the amount corresponding to five slots 405, and are connected to each other by the turn portion 407.

The slot portions 406 indicated by the region S5 and the region S6 are inserted into the pair of slots 405 spaced apart in the circumferential direction by the amount corresponding to six slots 405, and are connected to each other by the turn portion 407. Similarly, the pair of slot portions 406 indicated by the region S6 and the region S7 and the pair of slot portions 406 indicated by the region S7 and the region S8 are inserted into the pair of slots 405 spaced apart in the circumferential direction by the amount corresponding to six slots 405, and are connected to each other by the turn portion 407.

Figure 5:
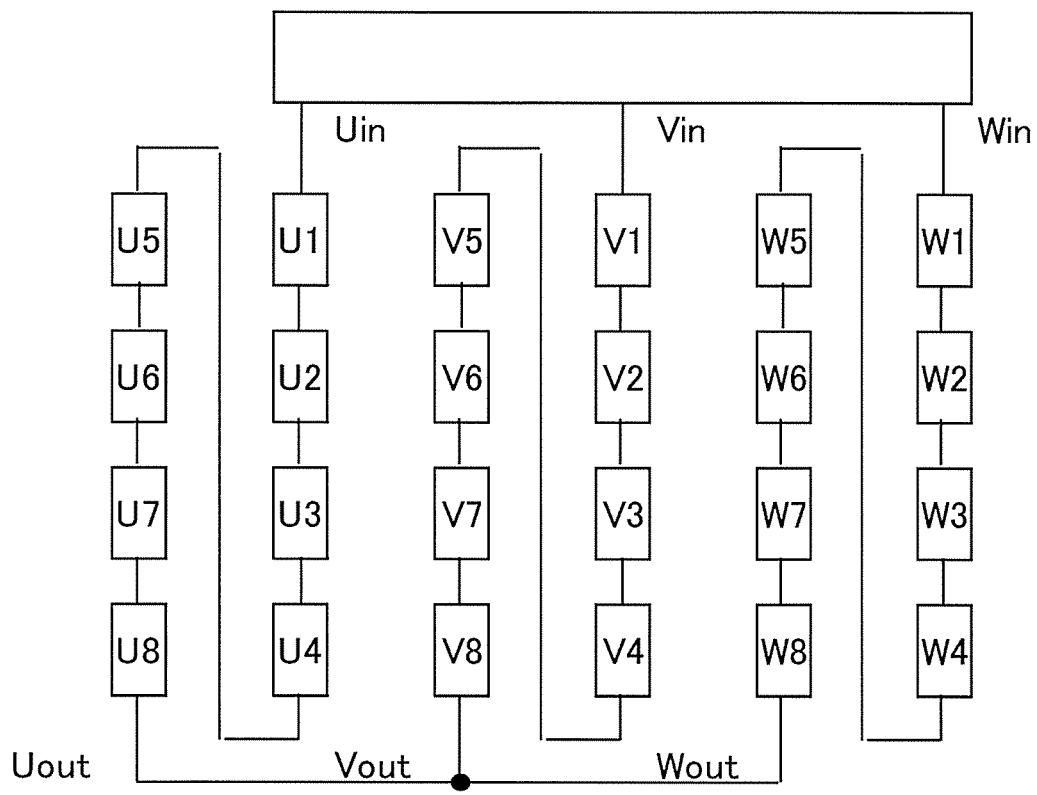
FIG. 5 is a connection diagram for illustrating coils of FIG. 1.

FIG. 5 is a connection diagram for illustrating the coils 402 of FIG. 1. In FIG. 5, U-phase coils 402 among the plurality of coils 402 are indicated by U1, U2, U3, U4, U5, U6, U7, and U8. Further, in FIG. 5, V-phase coils 402 among the plurality of coils 402 are indicated by V1, V2, V3, V4, V5, V6, V7, and V8. Further, in FIG. 5, W-phase coils 402 among the plurality of coils 402 are indicated by W1, W2, W3, W4, W5, W6, W7, and W8.

The outer-peripheral-side terminals 408 or the inner-peripheral-side terminals 409 of the coils 402 indicated by U1, V1, and W1 are connected to the inverter device. The outer-peripheral-side terminals 408 or the inner-peripheral-side terminals 409 of the coils 402 indicated by U8, V8, and W8 are connected to each other.

Twenty-four coils 402 are arranged in the circumferential direction. The stator core 401 is divided into a plurality of stator core segments. The plurality of stator core segments are inserted into the coils 402. In this example, the stator core 401 is mounted to the coils 402 through insertion of the stator core segments into the coils 402 from the outer side toward the inner side in the radial direction. It is not always required that the stator core 401 be divided into a plurality of stator core segments. In this case, the coils 402 are mounted to the stator core 401 through insertion of the coils 402 into the slots 405 of the stator core 401 from the inner side toward the outer side in the radial direction.

Figure 6:
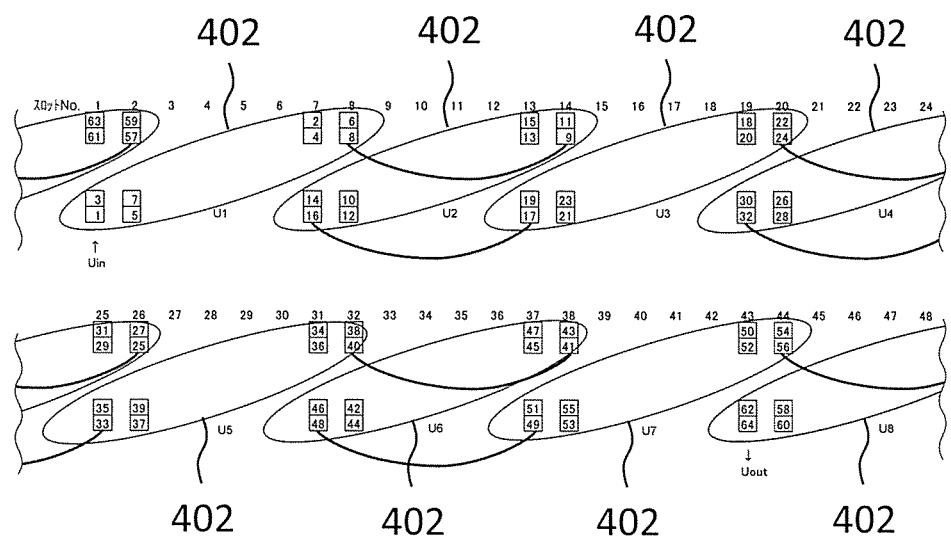
FIG. 6 is a view for illustrating a connection pattern of the plurality of coils.

FIG. 6 is a view for illustrating a connection pattern of the plurality of coils 402. In FIG. 6, $U_{in}$ represents a power supplying portion configured to supply a current to the U-phase coils 402, and $U_{out}$ represents a neutral point. In FIG. 6, the slot numbers specify the forty-eight slots 405, respectively. Four slot portions 406 are inserted into each of the slots 405 of FIG. 6. The four slot portions 406 inserted into one slot 405 are arranged in the radial direction. In FIG. 6, the order of insertion into the slot 405 is shown at the plurality of slot portions 406.

One coil 402 is arranged over two slots 405 arranged in the circumferential direction. With this, the number of coils 402 can be reduced.

Figure 7:
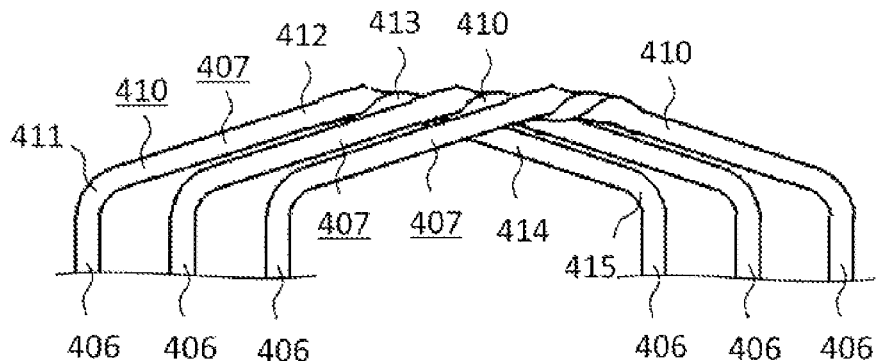
FIG. 7 is a front view for illustrating a plurality of turn portions of FIG. 4.
Figure 8:
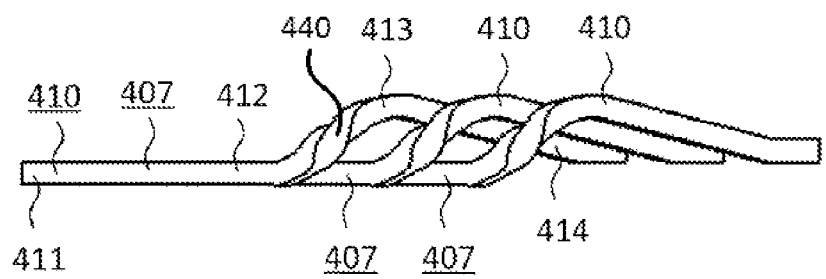
FIG. 8 is a plan view for illustrating the plurality of turn portions of FIG. 7.
Figure 9:
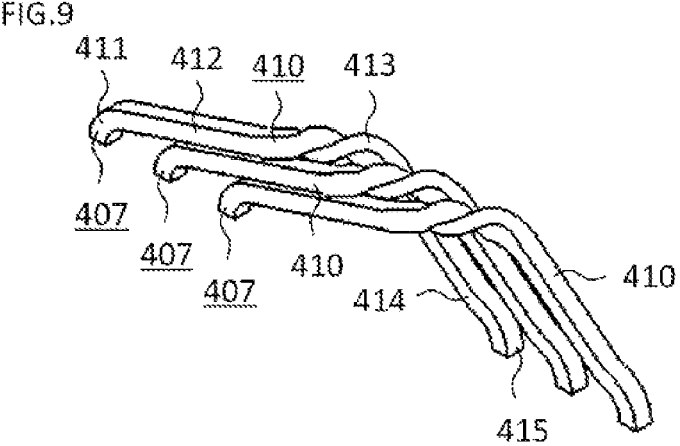
FIG. 9 is a perspective view for illustrating the plurality of turn portions of FIG. 7.
Figure 10:
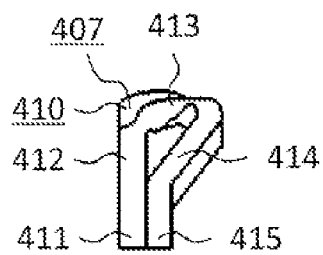
FIG. 10 is a side view for illustrating one of the turn portions of FIG. 9.

FIG. 7 is a front view for illustrating a plurality of turn portions 407 of FIG. 4. FIG. 8 is a plan view for illustrating the plurality of turn portions 407 of FIG. 7. FIG. 9 is a perspective view for illustrating the plurality of turn portions 407 of FIG. 7. FIG. 10 is a side view for illustrating one of the turn portions 407 of FIG. 9. In FIG. 7, the right-and-left direction corresponds to the circumferential direction, and the up-and-down direction corresponds to the radial direction. The plurality of turn portions 407 each include an inner-layer-side turn portion 410. The inner-layer-side turn portion 410 corresponds to the turn portion 407C and the turn portion 407G of FIG. 4.

The inner-layer-side turn portions 410 each include a first inner-layer-side bent portion 411, a first inner-layer-side oblique portion 412, an inner-layer-side shift portion 413, a second inner-layer-side oblique portion 414, and a second inner-layer-side bent portion 415.

The first inner-layer-side bent portion 411 is connected to the slot portion 406, and projects from the slot 405 in the axial direction. Moreover, the first inner-layer-side bent portion 411 is connected to the first inner-layer-side oblique portion 412. The first inner-layer-side bent portion 411 is bent in the circumferential direction so as to extend toward the circumferential direction as separating away from the slot portion 406 in the axial direction. In other words, the first inner-layer-side bent portion 411 is bent in the circumferential direction so that a position of a portion of the first inner-layer-side bent portion 411 on the first inner-layer-side oblique portion 412 side is apart in the circumferential direction with respect to a position of a portion of the first inner-layer-side bent portion 411 on the slot portion 406 side.

The first inner-layer-side oblique portion 412 extends in the circumferential direction as seen in the axial direction. Moreover, the first inner-layer-side oblique portion 412 is arranged in an inclined state with respect to a plane perpendicular to the axial direction so as to separate away from the stator core 401 in the axial direction as separating away from the first inner-layer-side bent portion 411 in the circumferential direction. The first inner-layer-side oblique portion 412 is connected to the inner-layer-side shift portion 413.

The inner-layer-side shift portion 413 is connected to the second inner-layer-side oblique portion 414. Moreover, the inner-layer-side shift portion 413 is bent so that positions of both end portions thereof are apart from each other in the radial direction. Specifically, a portion of the inner-layer-side shift portion 413 on the second inner-layer-side oblique portion 414 side is arranged on an outer side in the radial direction compared to a portion of the inner-layer-side shift portion 413 on the first inner-layer-side oblique portion 412 side. Moreover, the inner-layer-side shift portion 413 is twisted by half turn about a straight line passing through a center portion of the inner-layer-side shift portion 413 and extending in a longitudinal direction.

The second inner-layer-side oblique portion 414 extends in the circumferential direction as seen in the axial direction. Moreover, the second inner-layer-side oblique portion 414 is arranged in an inclined state with respect to a plane perpendicular to the axial direction so as to approach the stator core 401 in the axial direction as separating away from the inner-layer-side shift portion 413 in the circumferential direction. Moreover, the second inner-layer-side oblique portion 414 is arranged so as to extend toward an inner side in the radial direction as separating away from the inner-layer-side shift portion 413 in the circumferential direction. The second inner-layer-side oblique portion 414 is connected to the second inner-layer-side bent portion 415.

The second inner-layer-side bent portion 415 is connected to the slot portion 406, and projects from the slot 405 in the axial direction. The slot portion 406 having the second inner-layer-side bent portion 415 connected thereto is arranged apart in the circumferential direction with respect to the slot portion 406 having the first inner-layer-side bent portion 411 connected thereto. The second inner-layer-side bent portion 415 is bent in the circumferential direction so as to extend toward the circumferential direction as separating away from the slot portion 406 in the axial direction. In other words, the second inner-layer-side bent portion 415 is bent in the circumferential direction so that a position of a portion of the second inner-layer-side bent portion 415 on the second inner-layer-side oblique portion 414 side is apart in the circumferential direction with respect to a position of a portion of the second inner-layer-side bent portion 415 on the slot portion 406 side.

The pair of slot portions 406 arranged apart from each other in the circumferential direction are electrically connected to each other through intermediation of the first inner-layer-side bent portion 411, the first inner-layer-side oblique portion 412, the inner-layer-side shift portion 413, the second inner-layer-side oblique portion 414, and the second inner-layer-side bent portion 415. The pair of slot portions 406 electrically connected to each other through intermediation of the first inner-layer-side bent portion 411, the first inner-layer-side oblique portion 412, the inner-layer-side shift portion 413, the second inner-layer-side oblique portion 414, and the second inner-layer-side bent portion 415 are located at different positions in the radial direction. The first inner-layer-side oblique portion 412 and the second inner-layer-side oblique portion 414 are not twisted. The first inner-layer-side oblique portion 412 and the second inner-layer-side oblique portion 414 each have a linearly extending shape.

Figure 11:
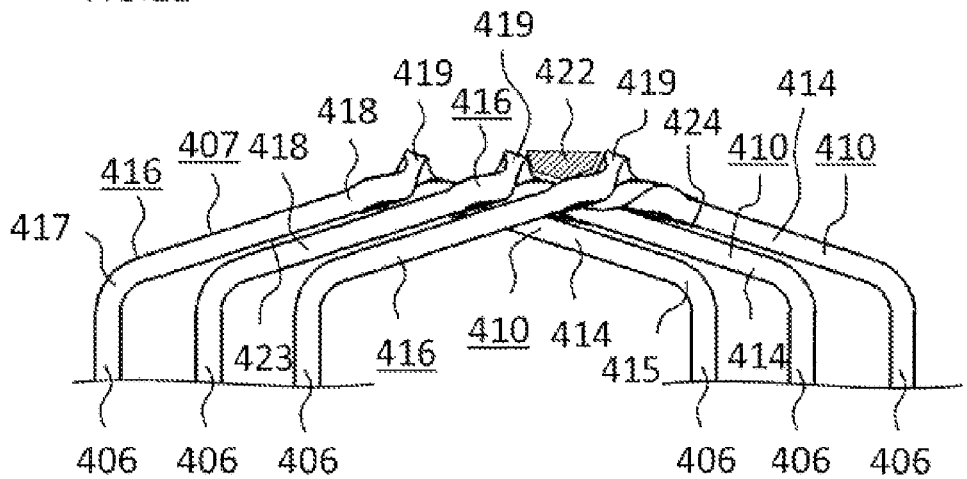
FIG. 11 is a front view for illustrating the plurality of turn portions of FIG. 4.
Figure 12:
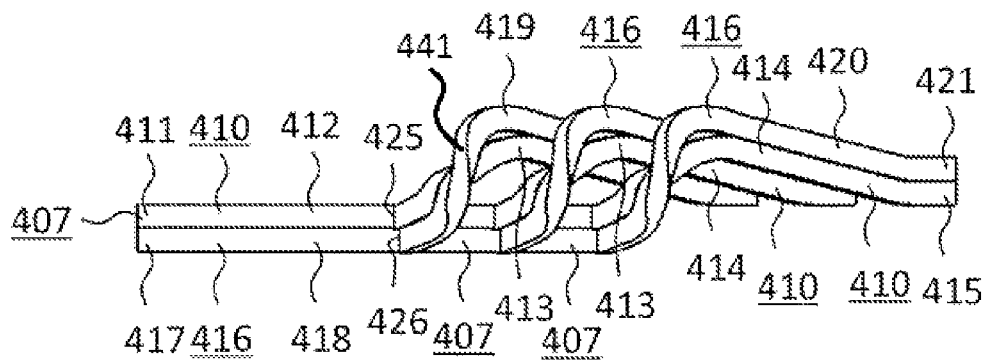
FIG. 12 is a plan view for illustrating the plurality of turn portions of FIG. 11.
Figure 13:
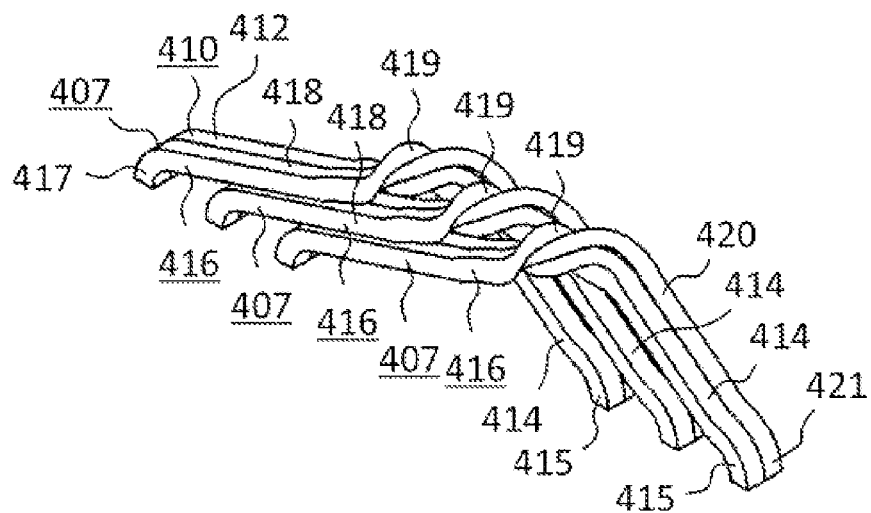
FIG. 13 is a perspective view for illustrating the plurality of turn portions of FIG. 11.
Figure 14:
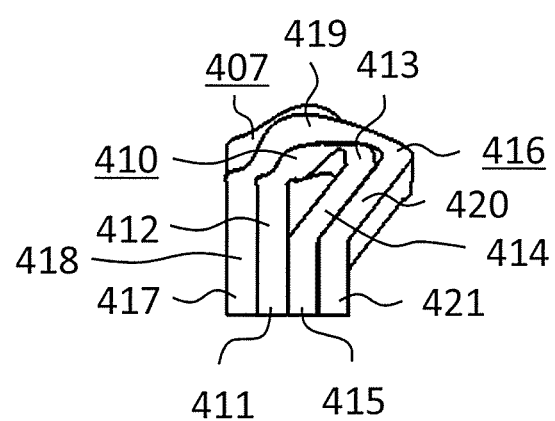
FIG. 14 is a side view for illustrating one of the turn portions of FIG. 13.

FIG. 11 is a front view for illustrating the plurality of turn portions 407 of FIG. 4. FIG. 12 is a plan view for illustrating the plurality of turn portions 407 of FIG. 11. FIG. 13 is a perspective view for illustrating the plurality of turn portions 407 of FIG. 11. FIG. 14 is a side view for illustrating one of the turn portions 407 of FIG. 13. The plurality of turn portions 407 each include an outer-layer-side turn portion 416. The outer-layer-side turn portion 416 corresponds to the turn portion 407A and the turn portion 407E of FIG. 4.

The outer-layer-side turn portions 416 each include a first outer-layer-side bent portion 417, a first outer-layer-side oblique portion 418, an outer-layer-side shift portion 419, a second outer-layer-side oblique portion 420, and a second outer-layer-side bent portion 421.

The first outer-layer-side bent portion 417 is connected to the slot portion 406, and projects from the slot 405 in the axial direction. Moreover, the first outer-layer-side bent portion 417 is connected to the first outer-layer-side oblique portion 418. The first outer-layer-side bent portion 417 is bent in the circumferential direction so as to extend toward the circumferential direction as separating away from the slot portion 406 in the axial direction. In other words, the first outer-layer-side bent portion 417 is bent in the circumferential direction so that a position of a portion of the first outer-layer-side bent portion 417 on the first outer-layer-side oblique portion 418 side is apart in the circumferential direction with respect to a position of a portion of the first outer-layer-side bent portion 417 on the slot portion 406 side.

The first outer-layer-side oblique portion 418 extends in the circumferential direction as seen in the axial direction. Moreover, the first outer-layer-side oblique portion 418 is arranged in an inclined state with respect to a plane perpendicular to the axial direction so as to separate away from the stator core 401 in the axial direction as separating away from the first outer-layer-side bent portion 417 in the circumferential direction. The first outer-layer-side oblique portion 418 is connected to the outer-layer-side shift portion 419.

The outer-layer-side shift portion 419 is connected to the second outer-layer-side oblique portion 420. Moreover, the outer-layer-side shift portion 419 is bent so that positions of both end portions thereof are apart from each other in the radial direction. Specifically, a portion of the outer-layer-side shift portion 419 on the second outer-layer-side oblique portion 420 side is arranged on an outer side in the radial direction compared to a portion of the outer-layer-side shift portion 419 on the first outer-layer-side oblique portion 418 side. Moreover, the outer-layer-side shift portion 419 is twisted by half turn about a straight line passing through a center portion of the outer-layer-side shift portion 419 and extending in a longitudinal direction. It is not always required that the outer-layer-side shift portion 419 be twisted.

The second outer-layer-side oblique portion 420 extends in the circumferential direction as seen in the axial direction. Moreover, the second outer-layer-side oblique portion 420 is arranged in an inclined state with respect to a plane perpendicular to the axial direction so as to approach the stator core 401 in the axial direction as separating away from the outer-layer-side shift portion 419 in the circumferential direction. Moreover, the second outer-layer-side oblique portion 420 is arranged so as to extend toward an inner side in the radial direction as separating away from the outer-layer-side shift portion 419 in the circumferential direction. The second outer-layer-side oblique portion 420 is connected to the second outer-layer-side bent portion 421.

The second outer-layer-side bent portion 421 is connected to the slot portion 406, and projects from the slot 405 in the axial direction. The slot portion 406 having the second outer-layer-side bent portion 421 connected thereto is arranged apart in the circumferential direction with respect to the slot portion 406 having the first outer-layer-side bent portion 417 connected thereto. The second outer-layer-side bent portion 421 is bent in the circumferential direction so as to extend toward the circumferential direction as separating away from the slot portion 406 in the axial direction. In other words, the second outer-layer-side bent portion 421 is bent in the circumferential direction so that a position of a portion of the second outer-layer-side bent portion 421 on the second outer-layer-side oblique portion 420 side is apart in the circumferential direction with respect to a position of a portion of the second outer-layer-side bent portion 421 on the slot portion 406 side.

The pair of slot portions 406 arranged apart from each other in the circumferential direction are electrically connected to each other through intermediation of the first outer-layer-side bent portion 417, the first outer-layer-side oblique portion 418, the outer-layer-side shift portion 419, the second outer-layer-side oblique portion 420, and the second outer-layer-side bent portion 421. The pair of slot portions 406 electrically connected to each other through intermediation of the first outer-layer-side bent portion 417, the first outer-layer-side oblique portion 418, the outer-layer-side shift portion 419, the second outer-layer-side oblique portion 420, and the second outer-layer-side bent portion 421 are located at different positions in the radial direction. The first outer-layer-side oblique portion 418 and the second outer-layer-side oblique portion 420 are not twisted. The first outer-layer-side oblique portion 418 and the second outer-layer-side oblique portion 420 each have a linearly extending shape.

Figure 15:
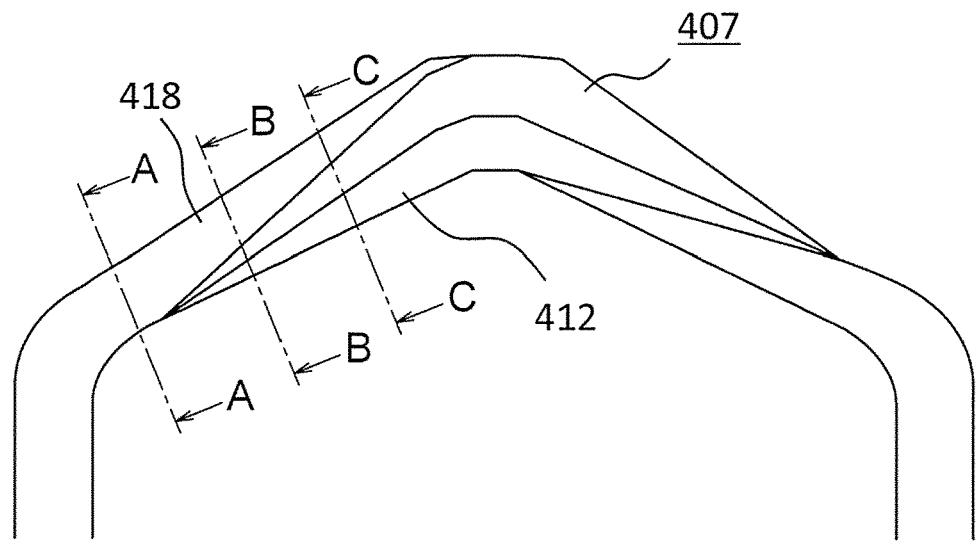
FIG. 15 is a front view for illustrating a turn portion of a comparative example.
Figure 16:
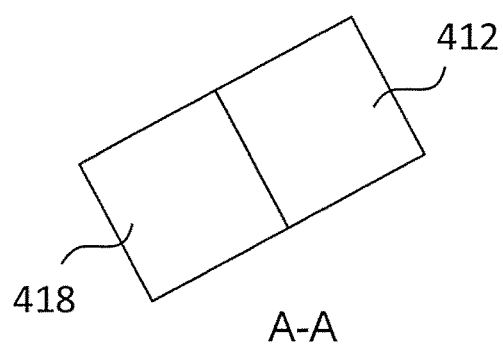
FIG. 16 is a sectional view taken along the line A-A of FIG. 15 as seen from the direction indicated by the arrows.
Figure 17:
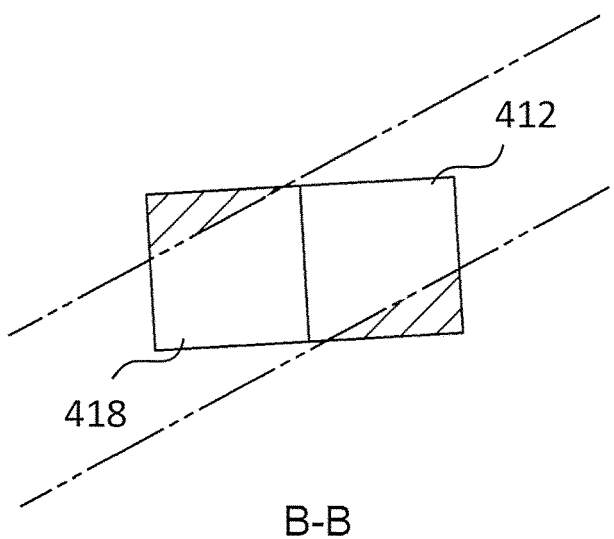
FIG. 17 is a sectional view taken along the line B-B of FIG. 15 as seen from the direction indicated by the arrows.
Figure 18:
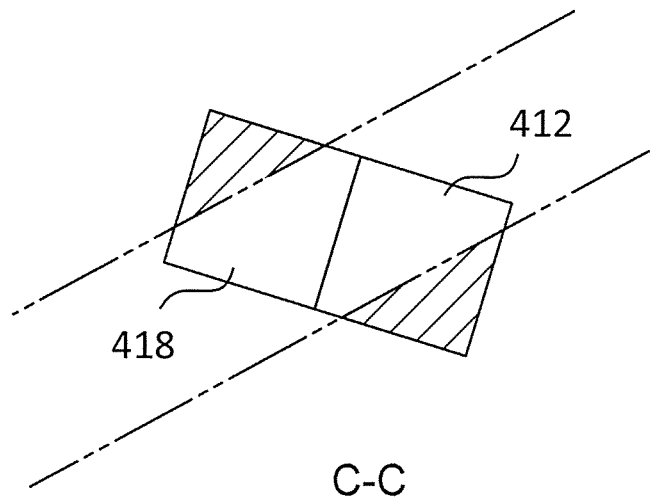
FIG. 18 is a sectional view taken along the line C-C of FIG. 15 as seen from the direction indicated by the arrows.

Here, a specific description is made of the structure in which the first inner-layer-side oblique portion 412, the second inner-layer-side oblique portion 414, the first outer-layer-side oblique portion 418, and the second outer-layer-side oblique portion 420 are not twisted. FIG. 15 is a front view for illustrating a turn portion of a comparative example. FIG. 16 is a sectional view taken along the line A-A of FIG. 15 as seen from the direction indicated by the arrows. FIG. 17 is a sectional view taken along the line B-B of FIG. 15 as seen from the direction indicated by the arrows. FIG. 18 is a sectional view taken along the line C-C of FIG. 15 as seen from the direction indicated by the arrows. FIG. 16, FIG. 17, and FIG. 18 are views for illustrating the first inner-layer-side oblique portion 412 and the first outer-layer-side oblique portion 418 as seen from an extension direction. When the first inner-layer-side oblique portion 412 and the first outer-layer-side oblique portion 418 are twisted, the first inner-layer-side oblique portion 412 and the first outer-layer-side oblique portion 418 are twisted more significantly as approaching a top portion of the turn portion 407. Therefore, the portions illustrated with hatching in FIG. 17 and FIG. 18 are regions which interfere with the first inner-layer-side oblique portion 412 and the first outer-layer-side oblique portion 418 which are adjacent thereto. In order to avoid the interference, it is required to set an axial length of the turn portion 407 to be larger by setting angles of the first inner-layer-side oblique portion 412 and the first outer-layer-side oblique portion 418 with respect to an axial end surface of the stator core 401 to be larger. The second inner-layer-side oblique portion 414 and the second outer-layer-side oblique portion 420 also have the same structure as the first inner-layer-side oblique portion 412 and the first outer-layer-side oblique portion 418.

Figure 19:
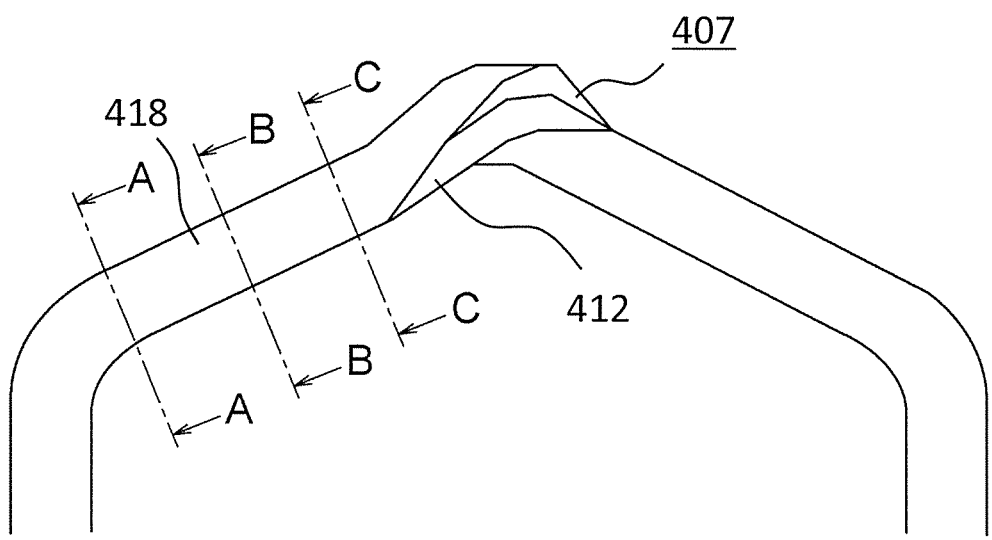
FIG. 19 is a front view for illustrating the turn portion of the first embodiment.
Figure 20:
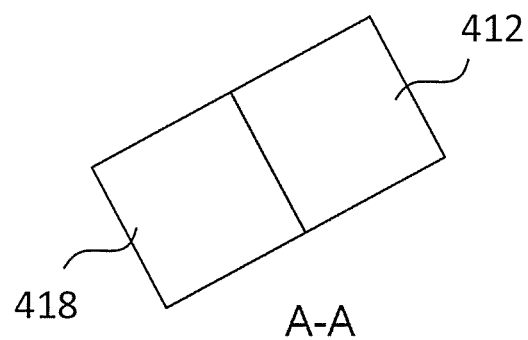
FIG. 20 is a sectional view taken along the line A-A of FIG. 19 as seen from the direction indicated by the arrows.
Figure 21:
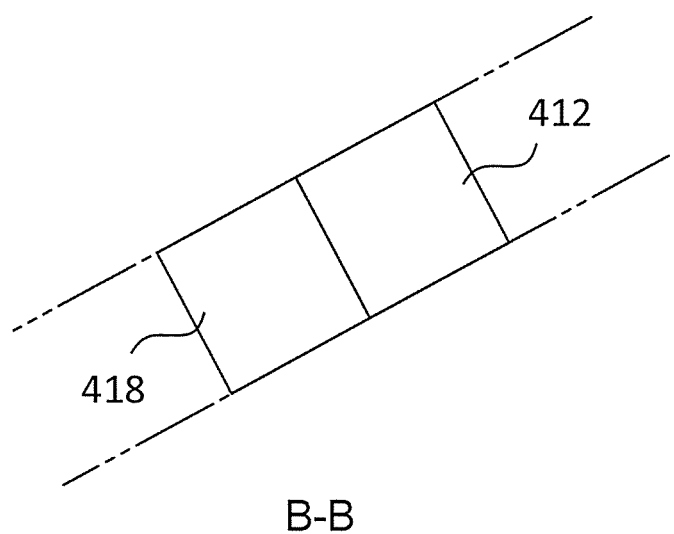
FIG. 21 is a sectional view taken along the line B-B of FIG. 19 as seen from the direction indicated by the arrows.
Figure 22:
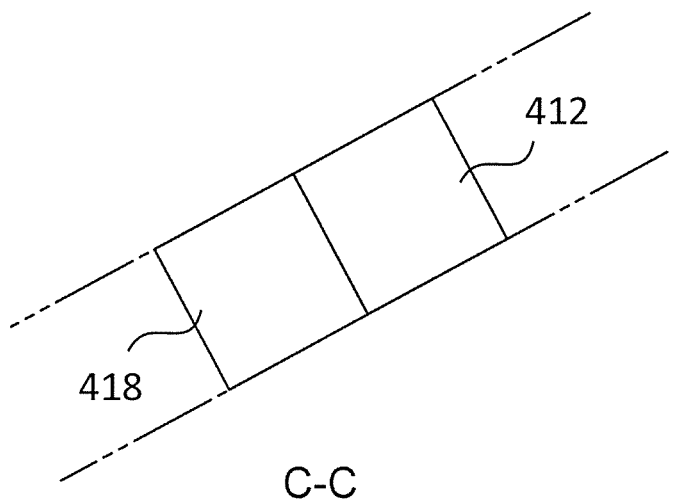
FIG. 22 is a sectional view taken along the line C-C of FIG. 19 as seen from the direction indicated by the arrows.

FIG. 19 is a front view for illustrating the turn portion 407 of the first embodiment. FIG. 20 is a sectional view taken along the line A-A of FIG. 19 as seen from the direction indicated by the arrows. FIG. 21 is a sectional view taken along the line B-B of FIG. 19 as seen from the direction indicated by the arrows. FIG. 22 is a sectional view taken along the line C-C of FIG. 19 as seen from the direction indicated by the arrows. In the first embodiment, the first inner-layer-side oblique portion 412, the second inner-layer-side oblique portion 414, the first outer-layer-side oblique portion 418, and the second outer-layer-side oblique portion 420 are not twisted. Thus, hatched portions like those illustrated in FIG. 17 and FIG. 18 are not present in FIG. 21 and FIG. 22. Therefore, the axial length of the turn portion 407 can be reduced by reducing angles of the first inner-layer-side oblique portion 412 and the first outer-layer-side oblique portion 418 with respect to the axial end surface of the stator core 401, thereby achieving an effect of downsizing a coil end of the coil 402. The second inner-layer-side oblique portion 414 and the second outer-layer-side oblique portion 420 also have the same structure as the first inner-layer-side oblique portion 412 and the first outer-layer-side oblique portion 418. The first inner-layer-side oblique portion 412, the second inner-layer-side oblique portion 414, the first outer-layer-side oblique portion 418, and the second outer-layer-side oblique portion 420 are oblique portions of the turn portion 407.

The outer-layer-side turn portion 416 is provided on an outer side of the inner-layer-side turn portion 410 as seen in the circumferential direction. The inner-layer-side turn portion 410 is connected to the slot portion 406 arranged on a center side among the plurality of slot portions 406 arranged in the radial direction. The outer-layer-side turn portion 416 is connected to the slot portion 406 other than the slot portion 406 arranged on the center side among the plurality of slot portions 406 arranged in the radial direction. In other words, the outer-layer-side turn portion 416 is connected to the slot portion 406 arranged on an outer side among the plurality of slot portions 406 arranged in the radial direction. The outer-layer-side turn portion 416 is provided along the inner-layer-side turn portion 410.

A cooling space 422 extending in the radial direction is defined between outer-layer-side shift portions 419 which are adjacent to each other in the circumferential direction.

At the plurality of turn portions 407 connected to the plurality of slot portions 406 inserted into the same slot 405, the first inner-layer-side oblique portion 412 and the first outer-layer-side oblique portion 418 are adjacent to each other in the radial direction. Further, at the plurality of turn portions 407 connected to the plurality of slot portions 406 inserted into the same slot 405, the second inner-layer-side oblique portion 414 and the second outer-layer-side oblique portion 420 are adjacent to each other in the radial direction.

At the turn portions 407 adjacent to each other in the circumferential direction, between the respective first inner-layer-side oblique portions 412 and between the respective first outer-layer-side oblique portions 418, a first oblique-portion gap 423 extending in the radial direction is defined. Moreover, at the turn portions 407 adjacent to each other in the circumferential direction, between the respective second inner-layer-side oblique portions 414 and between the respective second outer-layer-side oblique portions 420, a second oblique-portion gap 424 extending in the radial direction is defined.

At each of the inner-layer-side shift portion 413 and the outer-layer-side shift portion 419, respective intermediate portions 440 and 441 expand in the radial direction compared to both end portions. In this example, in each of the inner-layer-side shift portion 413 and the outer-layer-side shift portion 419, the intermediate portions 440 and 441 expand toward an outer side in the radial direction compared to the both end portions. In each of the inner-layer-side shift portion 413 and the outer-layer-side shift portion 419, the intermediate portions 440 and 441 may expand toward an inner side in the radial direction compared to the both end portions. Moreover, each of the inner-layer-side shift portion 413 and the outer-layer-side shift portion 419 is bent in the radial direction and extends in the circumferential direction.

An end portion of the inner-layer-side shift portion 413 on the first inner-layer-side oblique portion 412 side is referred to as a twist start portion 425. An end portion of the outer-layer-side shift portion 419 on the first outer-layer-side oblique portion 418 side is referred to as a twist start portion 426. The twist start portion 425 is arranged apart from a center portion of the turn portion 407 in the circumferential direction with respect to the twist start portion 426. That is, the end portion of the inner-layer-side shift portion 413 on the first inner-layer-side oblique portion 412 side is arranged apart from the center portion of the turn portion 407 in the circumferential direction compared to the end portion of the outer-layer-side shift portion 419 on the first outer-layer-side oblique portion 418 side. Further, in other words, a dimension between the twist start portion 425 and the first inner-layer-side bent portion 411 is smaller than a dimension between the twist start portion 426 and the first outer-layer-side bent portion 417.

Figure 23:
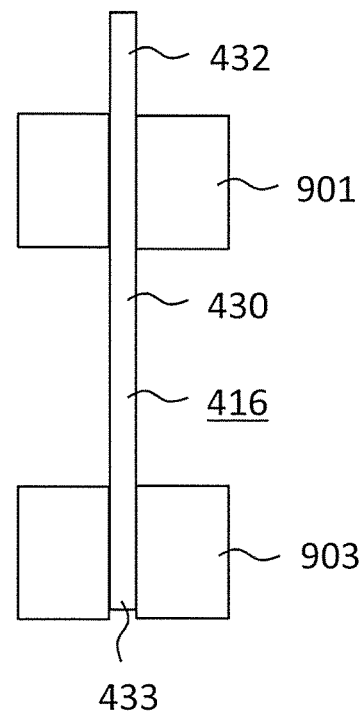
FIG. 23 is a front view for illustrating a manufacturing apparatus.
Figure 24:
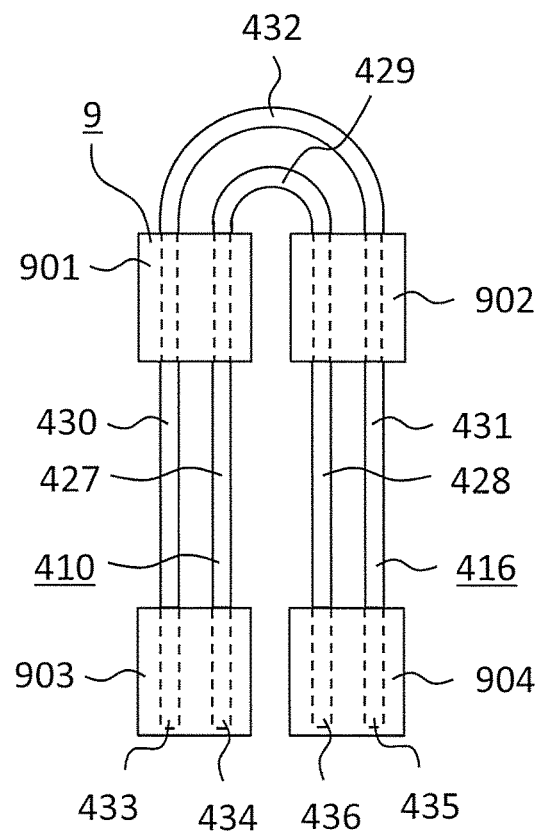
FIG. 24 is a side view for illustrating the manufacturing apparatus of FIG. 23.
Figure 25:
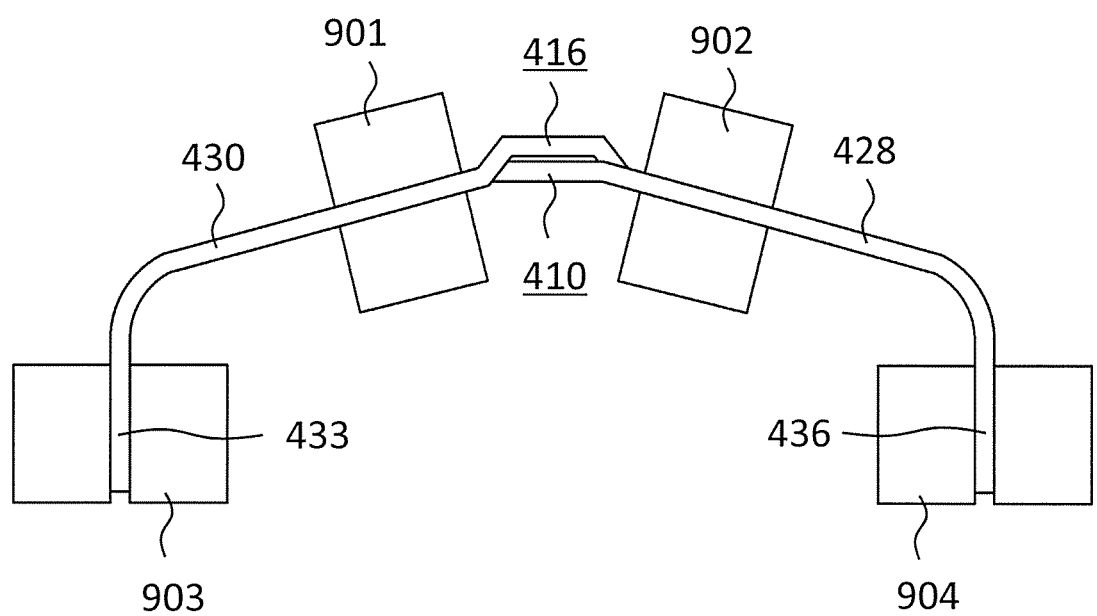
FIG. 25 is a front view for illustrating a state in which the manufacturing apparatus of FIG. 23 manufactures an inner-layer-side turn portion and an outer-layer-side turn portion.
Figure 26:
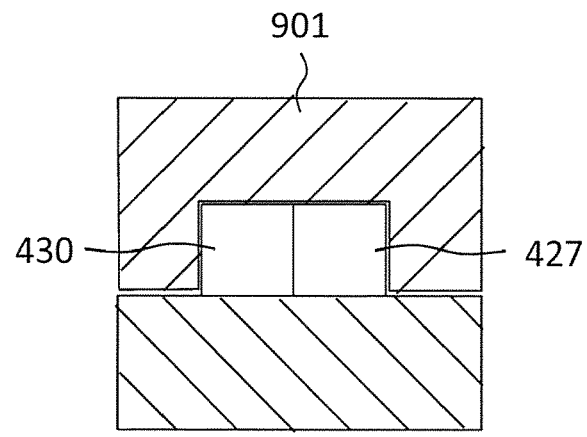
FIG. 26 is a sectional view for illustrating a main part of the manufacturing apparatus of FIG. 24.

Next, as a manufacturing method for the rotating electric machine 1, a manufacturing method for the inner-layer-side turn portion 410 and the outer-layer-side turn portion 416 is described. First, a manufacturing apparatus 9 configured to manufacture the rotating electric machine 1 is described. FIG. 23 is a front view for illustrating the manufacturing apparatus 9. FIG. 24 is a side view for illustrating the manufacturing apparatus 9 of FIG. 23. FIG. 25 is a front view for illustrating a state in which the manufacturing apparatus 9 of FIG. 23 manufactures the inner-layer-side turn portion 410 and the outer-layer-side turn portion 416. FIG. 26 is a sectional view for illustrating a main part of the manufacturing apparatus 9 of FIG. 24.

The inner-layer-side turn portion 410 before formation includes a first inner-layer-side extension portion 427, a second inner-layer-side extension portion 428, and an inner-layer-side curved portion 429. The second inner-layer-side extension portion 428 is arranged parallel to the first inner-layer-side extension portion 427. The inner-layer-side curved portion 429 is provided over the first inner-layer-side extension portion 427 and the second inner-layer-side extension portion 428. The inner-layer-side curved portion 429 is curved. The first inner-layer-side extension portion 427, the second inner-layer-side extension portion 428, and the inner-layer-side curved portion 429 are arranged on the same plane.

The outer-layer-side turn portion 416 before formation includes a first outer-layer-side extension portion 430, a second outer-layer-side extension portion 431, and an outer-layer-side curved portion 432. The second outer-layer-side extension portion 431 is arranged parallel to the first outer-layer-side extension portion 430. The outer-layer-side curved portion 432 is provided over the first outer-layer-side extension portion 430 and the second outer-layer-side extension portion 431. The outer-layer-side curved portion 432 is curved. The first outer-layer-side extension portion 430, the second outer-layer-side extension portion 431, and the outer-layer-side curved portion 432 are arranged on the same plane. Moreover, the first outer-layer-side extension portion 430, the second outer-layer-side extension portion 431, and the outer-layer-side curved portion 432 are arranged on the same plane as the first inner-layer-side extension portion 427, the second inner-layer-side extension portion 428, and the inner-layer-side curved portion 429. The plane on which the first inner-layer-side extension portion 427, the second inner-layer-side extension portion 428, the inner-layer-side curved portion 429, the first outer-layer-side extension portion 430, the second outer-layer-side extension portion 431, and the outer-layer-side curved portion 432 are arranged is referred to as a before-formation reference plane.

The manufacturing apparatus 9 includes a first turn-portion grip portion 901, a second turn-portion grip portion 902, a first slot-portion grip portion 903, and a second slot-portion grip portion 904.

The first turn-portion grip portion 901 is configured to grip the first outer-layer-side extension portion 430 and the first inner-layer-side extension portion 427. Specifically, the first turn-portion grip portion 901 is configured to grip a portion of the first outer-layer-side extension portion 430 on the outer-layer-side curved portion 432 side and a portion of the first inner-layer-side extension portion 427 on the inner-layer-side curved portion 429 side. FIG. 26 is an illustration of cross sections of the first turn-portion grip portion 901, the first outer-layer-side extension portion 430, and the first inner-layer-side extension portion 427.

The second turn-portion grip portion 902 is configured to grip the second outer-layer-side extension portion 431 and the second inner-layer-side extension portion 428. Specifically, the second turn-portion grip portion 902 is configured to grip a portion of the second outer-layer-side extension portion 431 on the outer-layer-side curved portion 432 side and a portion of the second inner-layer-side extension portion 428 on the inner-layer-side curved portion 429 side.

The first slot-portion grip portion 903 is configured to grip a first outer-layer-side slot portion 433, which is a slot portion connected to the first outer-layer-side extension portion 430, and a first inner-layer-side slot portion 434, which is a slot portion connected to the first inner-layer-side extension portion 427.

The second slot-portion grip portion 904 is configured to grip a second outer-layer-side slot portion 435, which is a slot portion connected to the second outer-layer-side extension portion 431, and a second inner-layer-side slot portion 436, which is a slot portion connected to the second inner-layer-side extension portion 428.

The first turn-portion grip portion 901 is movable relative to the second turn-portion grip portion 902 in a direction perpendicular to the before-formation reference plane. The first slot-portion grip portion 903 is movable relative to the second slot-portion grip portion 904 in a direction perpendicular to the before-formation reference plane.

Figure 27:
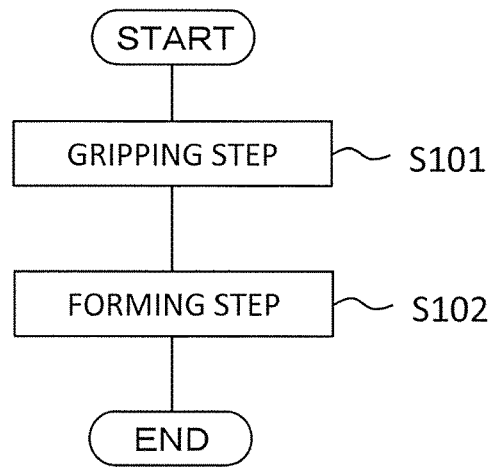
FIG. 27 is a flowchart for illustrating a manufacturing method for a rotating electric machine.

Next, as a manufacturing method for the rotating electric machine 1, a description is made of a manufacturing method for the inner-layer-side turn portion 410 and the outer-layer-side turn portion 416. FIG. 27 is a flowchart for illustrating the manufacturing method for the rotating electric machine 1. First, in Step S101, a gripping step is performed. In the gripping step, the first outer-layer-side extension portion 430, the first inner-layer-side extension portion 427, the second inner-layer-side extension portion 428, and the second outer-layer-side extension portion 431 are brought into a state of being arranged in a line. The first turn-portion grip portion 901 grips the first outer-layer-side extension portion 430 and the first inner-layer-side extension portion 427. The second turn-portion grip portion 902 grips the second outer-layer-side extension portion 431 and the second inner-layer-side extension portion 428. The first slot-portion grip portion 903 grips the first outer-layer-side slot portion 433 and the first inner-layer-side slot portion 434. The second slot-portion grip portion 904 grips the second outer-layer-side slot portion 435 and the second inner-layer-side slot portion 436.

After the gripping step, in Step S102, a forming step is performed. In the forming step, the first turn-portion grip portion 901 moves relative to the second turn-portion grip portion 902 in a direction perpendicular to the before-formation reference plane. With this, in the direction perpendicular to the before-formation reference plane, the second outer-layer-side extension portion 431 and the second inner-layer-side extension portion 428 move relative to the first outer-layer-side extension portion 430 and the first inner-layer-side extension portion 427. When the first turn-portion grip portion 901 moves relative to the second turn-portion grip portion 902, the first turn-portion grip portion 901 and the second turn-portion grip portion 902 move in a direction of approaching the first slot-portion grip portion 903 and the second slot-portion grip portion 904. With this, the inner-layer-side curved portion 429 and the outer-layer-side curved portion 432 are each twisted. As a result, the inner-layer-side shift portion 413 and the outer-layer-side shift portion 419 are formed. At this time, the first turn-portion grip portion 901 rotates about a rotation axis extending in the radial direction. With this, as illustrated in FIG. 19, the first inner-layer-side oblique portion 412 and the first outer-layer-side oblique portion 418 which are not twisted are obtained. Also with regard to the second turn-portion grip portion 902, the configuration similar to the first turn-portion grip portion 901 is given. With this, as illustrated in FIG. 19, the second inner-layer-side oblique portion 414 and the second outer-layer-side oblique portion 420 which are not twisted are obtained. Moreover, through movement of the first turn-portion grip portion 901 relative to the second turn-portion grip portion 902 in the circumferential direction, the inner-layer-side shift portion 413 and the outer-layer-side shift portion 419 extend in the circumferential direction while being bent in the radial direction. With this, the inner-layer-side shift portion 413 and the outer-layer-side shift portion 419 extend in the circumferential direction while being bent in the radial direction. The first turn-portion grip portion 901 may move relative to the second turn-portion grip portion 902 in the radial direction. In this case, the first turn-portion grip portion 901 moves in the radial direction in addition to the circumferential direction. With this, respective radial positions and circumferential positions of the inner-layer-side shift portion 413 and the outer-layer-side shift portion 419 can be suitably set.

Further, in the forming step, the first slot-portion grip portion 903 moves relative to the second slot-portion grip portion 904 in the direction perpendicular to the before-formation reference plane. With this, in the direction perpendicular to the before-formation reference plane, the second outer-layer-side slot portion 435 and the second inner-layer-side slot portion 436 move relative to the first outer-layer-side slot portion 433 and the first inner-layer-side slot portion 434. With this, the inner-layer-side turn portion 410 and the outer-layer-side turn portion 416 are formed. The direction perpendicular to the before-formation reference plane corresponds to a circumferential direction in a coordinate axis of the rotating electric machine. In the forming step, the first slot-portion grip portion 903 may move relative to the second slot-portion grip portion 904 on a straight line in the circumferential direction. In this case, further, the first slot-portion grip portion 903 moves relative to the second slot-portion grip portion 904 so that the first slot-portion grip portion 903 and the second slot-portion grip portion 904 separate apart by a set angle in the circumferential direction about a radial center. With this, the first outer-layer-side slot portion 433 and the first inner-layer-side slot portion 434 separate apart by the set angle in the circumferential direction about the radial center, and the second outer-layer-side slot portion 435 and the second inner-layer-side slot portion 436 separate apart by the set angle in the circumferential direction about the radial center. With this, the coil 402 is formed. Moreover, in the forming step, the first slot-portion grip portion 903 may move relative to the second slot-portion grip portion 904 on an arc in the circumferential direction. In this case, the coil 402 can be formed by one forming operation. With this, productivity of the rotating electric machine 1 can be improved.

As described above, in the rotating electric machine 1 according to the first embodiment, the inner-layer-side shift portion 413 is twisted. With this, the inner-layer-side turn portion 410 can be downsized in the axial direction. As a result, the coil end of the coil 402 can be downsized. Moreover, in the rotating electric machine 1 according to the first embodiment, with the inner-layer-side shift portion 413 being twisted, as compared to a coil having the inner-layer-side shift portion twisted in a semicircular shape, reliability of the coil 402 can be improved.

Moreover, in the rotating electric machine 1 according to the first embodiment, the outer-layer-side shift portion 419 is twisted. With this, the outer-layer-side turn portion 416 can be downsized in the axial direction. As a result, the coil end of the coil 402 can be downsized.

Moreover, in the rotating electric machine 1 according to the first embodiment, at the plurality of turn portions 407 connected to the plurality of slot portions 406 arranged in the same slot 405, the first inner-layer-side oblique portion 412 and the first outer-layer-side oblique portion 418 are adjacent to each other in the radial direction. With this, a pair of turn portions 407 adjacent to each other in the circumferential direction are suppressed from being brought into contact with each other. Through suppression of the contact between the pair of turn portions 407 adjacent to each other in the circumferential direction, when the coil 402 is to be assembled to the stator core 401, respective corner portions of the pair of turn portions 407 adjacent to each other in the circumferential direction are suppressed from being brought into contact with each other. With this, the insulating performance of the coil 402 can be improved.

Moreover, in the rotating electric machine 1 according to the first embodiment, between respective outer-layer-side shift portions 419 of a pair of turn portions 407 adjacent to each other in the circumferential direction, the cooling space 422 extending in the radial direction is defined. With this, the cooling performance of the coil 402 can be improved. When a fan configured to generate a flow of fluid in the radial direction is provided to the rotor 5, the cooling performance of the coil 402 can be further improved. Moreover, with the cooling space 422 defined between the outer-layer-side shift portions 419 adjacent to each other in the circumferential direction, the insulating performance between the outer-layer-side shift portions 419 adjacent to each other in the circumferential direction can be improved.

Moreover, in the rotating electric machine 1 according to the first embodiment, at the pair of turn portions 407 adjacent to each other in the circumferential direction, the first oblique-portion gap 423 is defined between the respective first inner-layer-side oblique portions 412 and between the respective first outer-layer-side oblique portions 418. With this, the cooling performance of the coil 402 can be improved. When the fan configured to generate a flow of fluid in the radial direction is provided to the rotor 5, the cooling performance of the coil 402 can be further improved. Moreover, through the formation of the first oblique-portion gap 423, at the pair of turn portions 407 adjacent to each other in the circumferential direction, the insulating performance between the respective first inner-layer-side oblique portions 412 and the insulating performance between the respective first outer-layer-side oblique portions 418 can be improved.

Moreover, in the rotating electric machine 1 according to the first embodiment, at the pair of turn portions 407 adjacent to each other in the circumferential direction, the second oblique-portion gap 424 is defined between the respective second inner-layer-side oblique portions 414 and between the respective second outer-layer-side oblique portions 420. With this, the cooling performance of the coil 402 can be improved. When the fan configured to generate a flow of fluid in the radial direction is provided to the rotor 5, the cooling performance of the coil 402 can be further improved. Moreover, through the formation of the second oblique-portion gap 424, at the pair of turn portions 407 adjacent to each other in the circumferential direction, the insulating performance between the respective second inner-layer-side oblique portions 414 and the insulating performance between the respective second outer-layer-side oblique portions 420 can be improved.

Moreover, in the rotating electric machine 1 according to the first embodiment, at each of the inner-layer-side shift portion 413 and the outer-layer-side shift portion 419, the intermediate portion expands in the radial direction compared to the both end portions. With this, respective dimensions of the inner-layer-side shift portion 413 and the outer-layer-side shift portion 419 in the longitudinal direction can be set to be larger. With this, damage on an insulating coating film for a lead wire forming the coil 402 can be reduced. As a result, reliability of the coil 402 can be improved.

Moreover, in the rotating electric machine 1 according to the first embodiment, each of the inner-layer-side shift portion 413 and the outer-layer-side shift portion 419 is bent in the radial direction and extends in the circumferential direction. With this, the respective dimensions of the first inner-layer-side oblique portion 412 and the first outer-layer-side oblique portion 418 in the longitudinal direction can be set to be smaller. As a result, the coil end of the coil 402 can be downsized.

Moreover, in the rotating electric machine 1 according to the first embodiment, the end portion of the inner-layer-side shift portion 413 on the first inner-layer-side oblique portion side 412 side is arranged apart from the center portion of the turn portion 407 in the circumferential direction compared to the end portion of the outer-layer-side shift portion 419 on the first outer-layer-side oblique portion 418 side. With this, the dimension of the inner-layer-side shift portion 413 in the longitudinal direction can be set to be larger than the dimension of the outer-layer-side shift portion 419 in the longitudinal direction. As a result, damage on the insulating coating film for the lead wire forming the inner-layer-side turn portion 410 can be reduced. As a result, the reliability of the coil 402 can be improved. Moreover, the dimension of the outer-layer-side shift portion 419 in the longitudinal direction can be set to be smaller. With this, the gap defined between the inner-layer-side turn portion 410 and the outer-layer-side turn portion 416 is reduced. As a result, the coil end of the coil 402 can be downsized.

Moreover, in the rotating electric machine 1 according to the first embodiment, the first inner-layer-side oblique portion 412 and the second inner-layer-side oblique portion 414 each have a linearly extending shape. With this, the axial length of the turn portion 407 can be set to be smaller, thereby being capable of downsizing the coil end of the coil 402.

Moreover, in the manufacturing method for the rotating electric machine 1 according to the first embodiment, respective movements of the inner-layer-side curved portion 429 and the outer-layer-side curved portion 432 are not restricted. With this, the reliability of the coil 402 can be improved.

Moreover, in the manufacturing method for the rotating electric machine 1 according to the first embodiment, the first outer-layer-side extension portion 430 and the first inner-layer-side extension portion 427 are gripped, and the second outer-layer-side extension portion 431 and the second inner-layer-side extension portion 428 are gripped. With this, the inner-layer-side turn portion 410 and the outer-layer-side turn portion 416 can be formed by one forming operation. As a result, productivity of the rotating electric machine 1 can be improved.

Moreover, in the manufacturing method for the rotating electric machine 1 according to the first embodiment, the first outer-layer-side slot portion 433 and the first inner-layer-side slot portion 434 are gripped, and the second outer-layer-side slot portion 435 and the second inner-layer-side slot portion 436 are gripped. With this, the slot portion 406 is suppressed from being twisted. As a result, a space factor of the coil 402 can be improved, thereby being capable of achieving higher output of the rotating electric machine 1.

Moreover, in the first embodiment, description has been made of the configuration in which the turn portion 407 is connected to both end portions of the slot portion 406 in the axial direction. However, there may be given a configuration in which the turn portion 407 is connected to only one end portion of the slot portion 406 in the axial direction. That is, there may be given a configuration of the turn portion 407 of so-called segment-conductor type.

In the first embodiment, description has been made of the configuration in which two layers of oblique portions of the turn portion 407 are arranged in the radial direction. Even with a configuration in which three or more oblique portions of the turn portion 407 are provided, the same effect can be attained.

Second Embodiment

Figure 28:
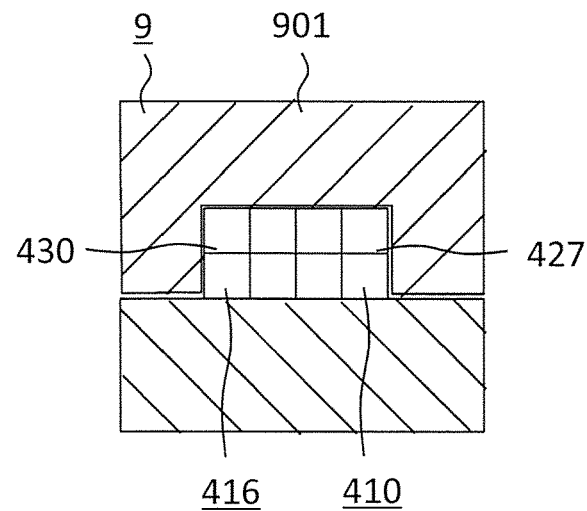
FIG. 28 is a sectional view for illustrating a main part of a rotating electric machine according to a second embodiment of the present disclosure.

FIG. 28 is a sectional view for illustrating a main part of a rotating electric machine according to a second embodiment of the present disclosure. In FIG. 28, illustration is given of cross sections of the first turn-portion grip portion 901, the first outer-layer-side extension portion 430, and the first inner-layer-side extension portion 427. The inner-layer-side turn portion 410 and the outer-layer-side turn portion 416 are each formed of a plurality of lead wires. In FIG. 28, the inner-layer-side turn portion 410 is formed of four lead wires, and the outer-layer-side turn portion 416 is formed of four lead wires. The plurality of lead wires forming the inner-layer-side turn portion 410 and the plurality of lead wires forming the outer-layer-side turn portion 416 are formed at the same time. Other configurations are the same as those of the first embodiment.

As described above, in the rotating electric machine 1 according to the second embodiment, each of the inner-layer-side turn portion 410 and the outer-layer-side turn portion 416 is formed of the plurality of lead wires. With this, the number of turns of the coil 402 can be increased. Thus, higher output of the rotating electric machine 1 can be achieved.

With the manufacturing method for the rotating electric machine 1 according to the second embodiment, the inner-layer-side turn portion 410 formed of the plurality of lead wires and the outer-layer-side turn portion 416 formed of the plurality of lead wires are formed at the same time. With this, as compared to a case of separately forming the plurality of lead wires, productivity of the rotating electric machine 1 can be improved.

Third Embodiment

Figure 29:
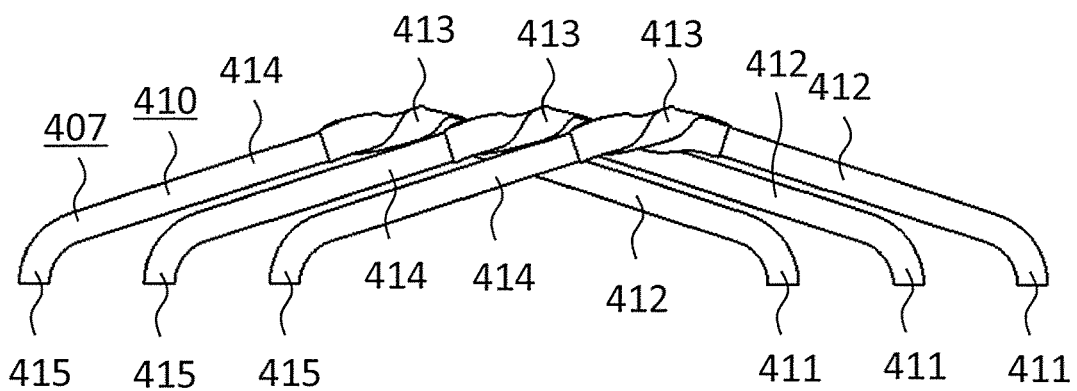
FIG. 29 is a front view for illustrating an inner-layer-side turn portion of a rotating electric machine according to a third embodiment of the present disclosure.
Figure 30:
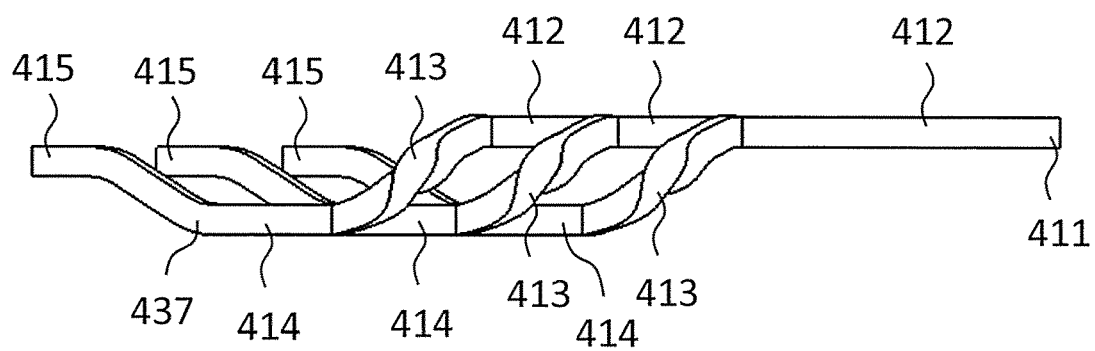
FIG. 30 is a plan view for illustrating the inner-layer-side turn portion of FIG. 29.

FIG. 29 is a front view for illustrating an inner-layer-side turn portion of a rotating electric machine according to a third embodiment of the present disclosure. FIG. 30 is a plan view for illustrating the inner-layer-side turn portion of FIG. 29. The second inner-layer-side oblique portion 414 includes a radially bent portion 437 which is bent toward an outer side in the radial direction. With this, of the pair of inner-layer-side turn portions 410 adjacent to each other in the circumferential direction as seen in the axial direction, a center portion of the inner-layer-side shift portion 413 of one inner-layer-side turn portion 410 and the second inner-layer-side oblique portion 414 of another inner-layer-side turn portion 410 are apart from each other in the radial direction. Thus, the inner-layer-side shift portion 413 of the one inner-layer-side turn portion 410 and the second inner-layer-side oblique portion 414 of the another inner-layer-side turn portion 410 are not brought into contact with each other. The center portion of the inner-layer-side shift portion 413 is a portion of the inner-layer-side shift portion 413 which is most significantly twisted. Other configurations are the same as those of the first embodiment or the second embodiment.

Figure 31:
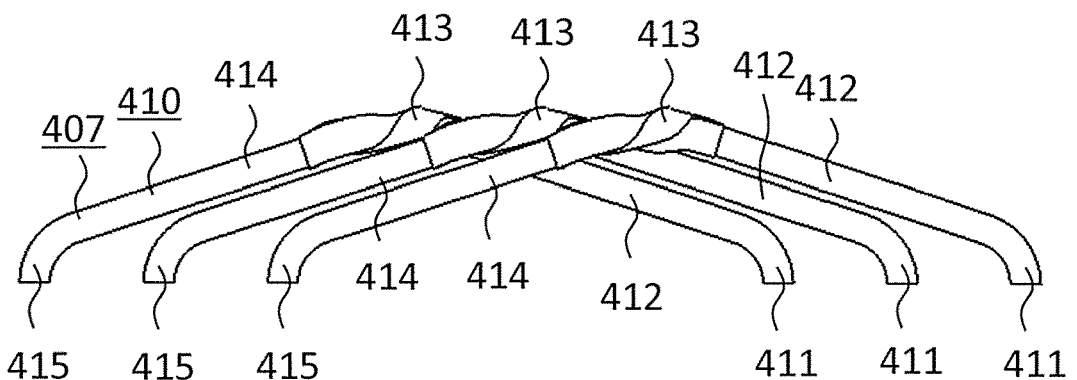
FIG. 31 is a front view for illustrating an inner-layer-side turn portion of a comparative example.
Figure 32:
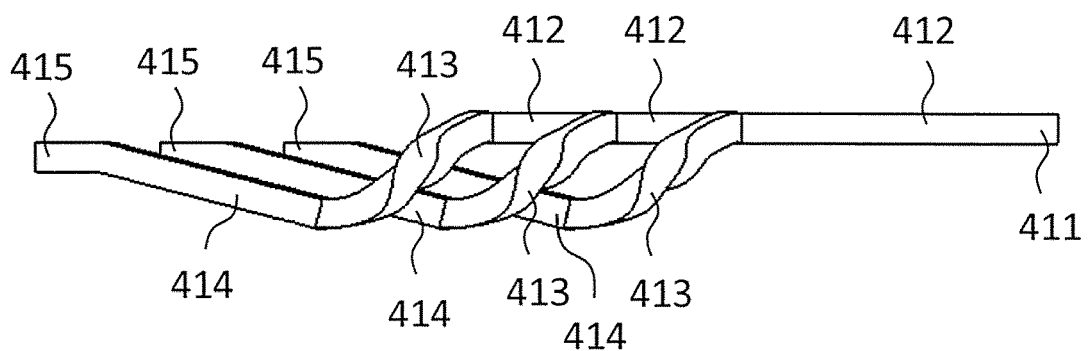
FIG. 32 is a plan view for illustrating the inner-layer-side turn portion of FIG. 31.

FIG. 31 is a front view for illustrating an inner-layer-side turn portion of a comparative example. FIG. 32 is a plan view for illustrating the inner-layer-side turn portion of FIG. 31. The second inner-layer-side oblique portion 414 of the comparative example does not include the radially bent portion 437. Thus, of the inner-layer-side turn portions 410 adjacent to each other in the circumferential direction as seen in the axial direction, a center portion of the inner-layer-side shift portion 413 of one inner-layer-side turn portion 410 and the second inner-layer-side oblique portion 414 of another inner-layer-side turn portion 410 overlap each other. In this case, in order to suppress the inner-layer-side shift portion 413 of the one inner-layer-side turn portion 410 and the second inner-layer-side oblique portion 414 of the another inner-layer-side turn portion 410 from being brought into contact with each other, it is required that a gap between the pair of inner-layer-side turn portions 410 in the axial direction be set to be larger.

As described above, in the rotating electric machine 1 according to the third embodiment, the center portion of the inner-layer-side shift portion 413 of the one inner-layer-side turn portion 410 and the second inner-layer-side oblique portion 414 of the another inner-layer-side turn portion 410 are apart from each other in the radial direction as seen in the axial direction. With this, the inner-layer-side shift portion 413 of the one inner-layer-side turn portion 410 and the second inner-layer-side oblique portion 414 of the another inner-layer-side turn portion 410 are suppressed from being brought into contact with each other. Moreover, there is no need to set the gap in the axial direction between the pair of inner-layer-side turn portions 410 to be larger, and hence the gap in the axial direction between the pair of inner-layer-side turn portions 410 can be set to be smaller. As a result, the coil end of the coil 402 can be downsized.

Fourth Embodiment

Figure 33:
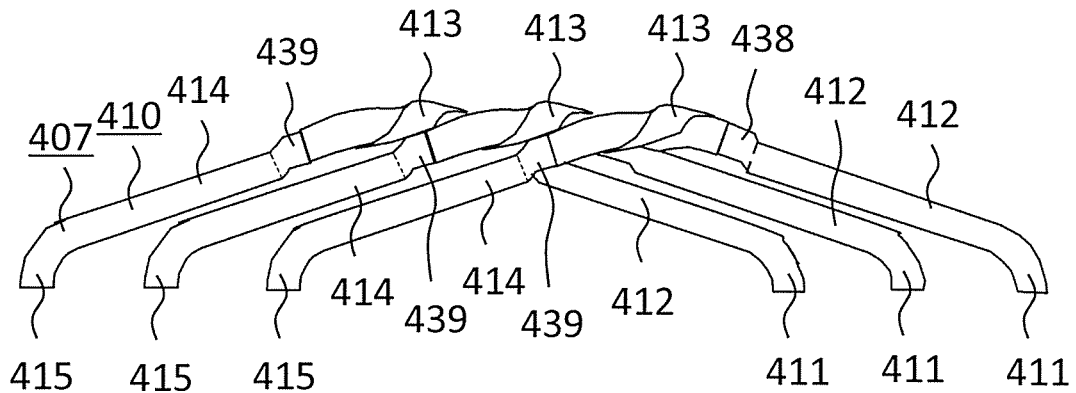
FIG. 33 is a front view for illustrating an inner-layer-side turn portion of a rotating electric machine according to a fourth embodiment of the present disclosure.
Figure 34:
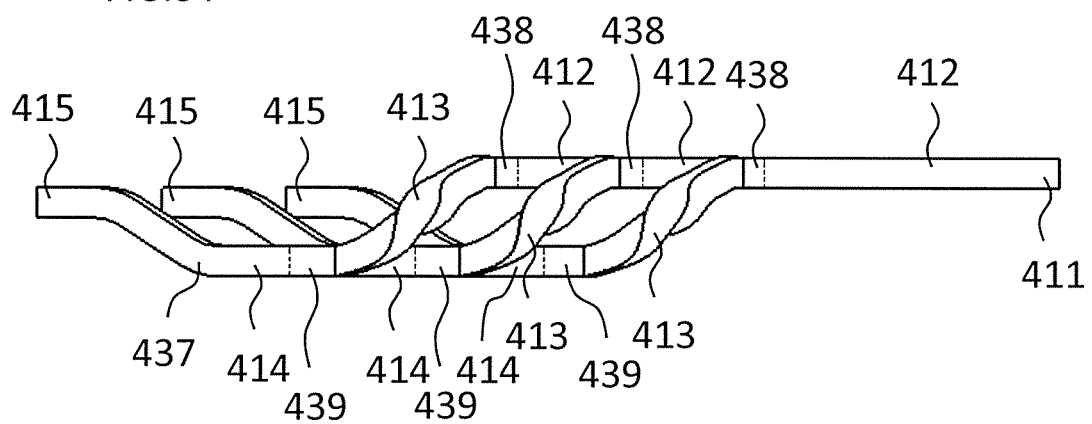
FIG. 34 is a plan view for illustrating the inner-layer-side turn portion of FIG. 33.

FIG. 33 is a front view for illustrating an inner-layer-side turn portion of a rotating electric machine according to a fourth embodiment of the present disclosure. FIG. 34 is a plan view for illustrating the inner-layer-side turn portion of FIG. 33. At a portion of the first inner-layer-side oblique portion 412 on the inner-layer-side shift portion 413 side, there is formed an axially bent portion 438 which is bent in the axial direction so as to separate away from the stator core 401 as approaching the inner-layer-side shift portion 413.

At a portion of the second inner-layer-side oblique portion 414 on the inner-layer-side shift portion 413 side, there is formed an axially bent portion 439 which is bent in the axial direction so as to separate away from the stator core 401 as approaching the inner-layer-side shift portion 413. The axially bent portion 438 and the axially bent portion 439 each have a step shape. Other configurations are the same as those of the first to third embodiments.

As described above, in the rotating electric machine 1 according to the fourth embodiment, the axially bent portion 438 is formed at the first inner-layer-side oblique portion 412. With this, the gap in the axial direction between, of the pair of the inner-layer-side turn portions 410 adjacent to each other in the circumferential direction, the inner-layer-side shift portion 413 of one inner-layer-side turn portion 410 and the first inner-layer-side oblique portion 412 of another inner-layer-side turn portion 410 becomes larger. Thus, the inner-layer-side shift portion 413 of the one inner-layer-side turn portion 410 and the first inner-layer-side oblique portion 412 of the another inner-layer-side turn portion 410 are suppressed from being brought into contact with each other. Moreover, the gap in the axial direction between the inner-layer-side shift portion 413 of the one inner-layer-side turn portion 410 and the first inner-layer-side oblique portion 412 of the another inner-layer-side turn portion 410 can be set to be smaller. As a result, the coil end of the coil 402 can be downsized.

Moreover, in the rotating electric machine 1 according to the fourth embodiment, the gap in the axial direction between the inner-layer-side shift portion 413 of the one inner-layer-side turn portion 410 and the first inner-layer-side oblique portion 412 of the another inner-layer-side turn portion 410 becomes larger. With this, cooling air is allowed to pass through the gap between the inner-layer-side shift portion 413 of the one inner-layer-side turn portion 410 and the first inner-layer-side oblique portion 412 of the another inner-layer-side turn portion 410. With this, the cooling performance of the coil 402 can be improved.

Moreover, in the rotating electric machine 1 according to the fourth embodiment, the axially bent portion 439 is formed at the second inner-layer-side oblique portion 414. With this, the gap in the axial direction between, of the pair of the inner-layer-side turn portions 410 adjacent to each other in the circumferential direction, the inner-layer-side shift portion 413 of one inner-layer-side turn portion 410 and the second inner-layer-side oblique portion 414 of another inner-layer-side turn portion 410 becomes larger. Thus, the inner-layer-side shift portion 413 of the one inner-layer-side turn portion 410 and the second inner-layer-side oblique portion 414 of the another inner-layer-side turn portion 410 are suppressed from being brought into contact with each other. Moreover, the gap in the axial direction between the inner-layer-side shift portion 413 of the one inner-layer-side turn portion 410 and the second inner-layer-side oblique portion 414 of the another inner-layer-side turn portion 410 can be set to be smaller. As a result, the coil end of the coil 402 can be downsized.

Moreover, in the rotating electric machine 1 according to the fourth embodiment, the gap in the axial direction between the inner-layer-side shift portion 413 of the one inner-layer-side turn portion 410 and the second inner-layer-side oblique portion 414 of the another inner-layer-side turn portion 410 becomes larger. With this, cooling air is allowed to pass through the gap between the inner-layer-side shift portion 413 of the one inner-layer-side turn portion 410 and the second inner-layer-side oblique portion 414 of the another inner-layer-side turn portion 410. With this, the cooling performance of the coil 402 can be improved.

Figure 35:
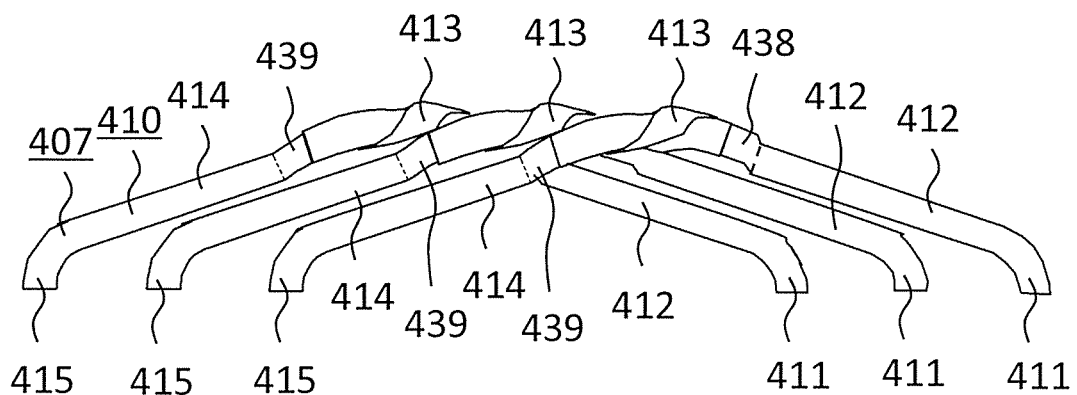
FIG. 35 is a front view for illustrating an inner-layer-side turn portion of a modification example.

FIG. 35 is a front view for illustrating an inner-layer-side turn portion of a modification example. In the fourth embodiment, description has been made of the configuration in which the axially bent portion 438 and the axially bent portion 439 each have the step shape. However, the axially bent portion 438 and the axially bent portion 439 may each have a configuration of being curved in the axial direction so as to separate away from the stator core 401 as approaching the inner-layer-side shift portion 413.

What is claimed is:
1. A rotating electric machine, comprising:
an armature core having a plurality of slots arranged in a circumferential direction; and
a plurality of coils of distributed winding, which are provided to the armature core,
wherein the plurality of the coils each include:
a plurality of slot portions which are inserted into the plurality of slots and arranged in a radial direction; and
a plurality of turn portions which are connected to the plurality of the slot portions, respectively, and project from the plurality of slots in an axial direction,
wherein a turn portion of the plurality of the turn portions includes:
an inner-layer-side turn portion connected to the slot portion which is arranged on a center side among the plurality of slot portions arranged in the radial direction,
wherein another turn portion of the plurality of the turn portions includes:
an outer-layer-side turn portion, which is provided along the inner-layer-side turn portion, and is connected to the slot portion arranged on an outer side among the plurality of slot portions arranged in the radial direction,
wherein the inner-layer-side turn portion includes:
a first inner-layer-side bent portion, which is connected to the slot portion, projects from the slot in the axial direction, and is bent so as to extend in the circumferential direction as separating away from the slot portion in the axial direction;
a first inner-layer-side oblique portion, which is connected to the first inner-layer-side bent portion, and is arranged so as to separate away from the armature core in the axial direction as separating away from the first inner-layer-side bent portion in the circumferential direction; and
an inner-layer-side shift portion, which is connected to the first inner-layer-side oblique portion, is bent so that positions of both end portions thereof are apart from each other in the radial direction, and is twisted,
wherein the outer-layer-side turn portion includes:
a first outer-layer-side bent portion, which is connected to the slot portion, projects from the slot in the axial direction, and is bent so as to extend toward the circumferential direction as separating away from the slot portion in the axial direction;
a first outer-layer-side oblique portion, which is connected to the first outer-layer-side bent portion, and is arranged so as to separate away from the armature core in the axial direction as separating away from the first outer-layer-side bent portion in the circumferential direction; and
an outer-layer-side shift portion, which is connected to the first outer-layer-side oblique portion, is bent so that positions of both end portions thereof are apart from each other in the radial direction, and has the inner-layer-side shift portion arranged between the outer-layer-side shift portion and the armature core.

2. The rotating electric machine according to claim 1, wherein a cooling space extending in the radial direction is defined between the respective outer-layer-side shift portions of the pair of turn portions adjacent to each other in the circumferential direction.

3. The rotating electric machine according to claim 1, wherein, at the plurality of turn portions connected to the plurality of slot portions inserted into the same slot, the first inner-layer-side oblique portion and the first outer-layer-side oblique portion are adjacent to each other in the radial direction, and
wherein a first oblique-portion gap is defined between the respective first inner-layer-side oblique portions of the pair of turn portions adjacent to each other in the circumferential direction and between the respective first outer-layer-side oblique portions of the pair of turn portions adjacent to each other in the circumferential direction.

4. The rotating electric machine according to claim 1, wherein, at each of the inner-layer-side shift portion and the outer-layer-side shift portion, an intermediate portion expands in the radial direction compared to both end portions.

5. The rotating electric machine according to claim 1, wherein each of the inner-layer-side shift portion and the outer-layer-side shift portion is bent in the radial direction and extends in the circumferential direction.

6. The rotating electric machine according to claim 1, wherein the outer-layer-side shift portion is twisted, and
wherein an end portion of the inner-layer-side shift portion on the first inner-layer-side oblique portion side is arranged apart from a center portion of the turn portion in the circumferential direction compared to an end portion of the outer-layer-side shift portion on the first outer-layer-side oblique portion side.

7. The rotating electric machine according to claim 1, wherein each of the inner-layer-side turn portion and the outer-layer-side turn portion is formed of a plurality of lead wires.

8. The rotating electric machine according to claim 1, wherein the first inner-layer-side oblique portion has a linearly extending shape.

9. The rotating electric machine according to claim 1,
wherein the inner-layer-side turn portion further includes a second inner-layer-side oblique portion connected to the inner-layer-side shift portion, and
wherein, of a pair of inner-layer-side turn portions adjacent to each other in the circumferential direction as seen in the axial direction, a center portion of the inner-layer-side shift portion of one inner-layer-side turn portion and the second inner-layer-side oblique portion of another inner-layer-side turn portion are apart from each other in the radial direction.

10. The rotating electric machine according to claim 1, wherein, at a portion of the first inner-layer-side oblique portion on the inner-layer-side shift portion side, an axially bent portion bent in the axial direction so as to separate away from the armature core as approaching the inner-layer-side shift portion is formed.

11. A manufacturing method for the rotating electric machine of claim 1,
the inner-layer-side turn portion before being formed including:
a first inner-layer-side extension portion;
a second inner-layer-side extension portion provided so as to be parallel to the first inner-layer-side extension portion; and
an inner-layer-side curved portion, which is provided over the first inner-layer-side extension portion and the second inner-layer-side extension portion, and is curved,
the outer-layer-side turn portion before being formed including:
a first outer-layer-side extension portion;
a second outer-layer-side extension portion provided so as to be parallel to the first outer-layer-side extension portion; and
an outer-layer-side curved portion, which is provided over the first outer-layer-side extension portion and the second outer-layer-side extension portion, and is curved,
the manufacturing method comprising:
a gripping step of, under a state in which the first outer-layer-side extension portion, the first inner-layer-side extension portion, the second inner-layer-side extension portion, and the second outer-layer-side extension portion are arranged in line, gripping the first outer-layer-side extension portion and the first inner-layer-side extension portion, gripping the second outer-layer-side extension portion and the second inner-layer-side extension portion, gripping a first outer-layer-side slot portion being the slot potion connected to the first outer-layer-side extension portion and a first inner-layer-side slot portion being the slot portion connected to the first inner-layer-side extension portion, and gripping a second outer-layer-side slot portion being the slot portion connected to the second outer-layer-side extension portion and a second inner-layer-side slot portion being the slot portion connected to the second inner-layer-side extension portion; and
a forming step of, after the gripping step, forming the inner-layer-side turn portion and the outer-layer-side turn portion by moving the second outer-layer-side extension portion and the second inner-layer-side extension portion relative to the first outer-layer-side extension portion and the first inner-layer-side extension portion and moving the second outer-layer-side slot portion and the second inner-layer-side slot portion relative to the first outer-layer-side slot portion and the first inner-layer-side slot portion, in a direction perpendicular to a before-formation reference plane being a plane on which the first outer-layer-side extension portion, the first inner-layer-side extension portion, the second inner-layer-side extension portion, and the second outer-layer-side extension portion are arranged.

12. The manufacturing method for a rotating electric machine according to claim 11, wherein, in the gripping step, a portion of the first outer-layer-side extension portion on the outer-layer-side curved portion side and a portion of the first inner-layer-side extension portion on the inner-layer-side curved portion side are gripped, and a portion of the second outer-layer-side extension portion on the outer-layer-side curved portion side and a portion of the second inner-layer-side extension portion on the inner-layer-side curved portion side are gripped.

* * * * *